United States Patent
Solheid et al.

(10) Patent No.: US 6,591,051 B2
(45) Date of Patent: Jul. 8, 2003

(54) FIBER TERMINATION BLOCK WITH ANGLED SLIDE

(75) Inventors: James J. Solheid, Lakeville, MN (US); Matthew J. Holmberg, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/991,271

(22) Filed: Nov. 16, 2001

(65) Prior Publication Data

US 2003/0095772 A1 May 22, 2003

(51) Int. Cl.[7] .................................................. G02B 6/00
(52) U.S. Cl. ........................ 385/134; 385/135; 385/136
(58) Field of Search ................................... 385/134–137

(56) References Cited

U.S. PATENT DOCUMENTS

| | | | |
|---|---|---|---|
| 4,359,262 A | 11/1982 | Dolan | |
| 4,502,754 A | 3/1985 | Kawa | |
| 4,585,303 A | 4/1986 | Pinsard et al. | |
| 4,595,255 A | 6/1986 | Bhatt et al. | |
| 4,630,886 A | 12/1986 | Lauriello et al. | |
| 4,669,455 A | 6/1987 | Erbe et al. | |
| 4,717,231 A | 1/1988 | Dewez et al. | |
| 4,765,710 A | 8/1988 | Burmeister et al. | |
| 4,792,203 A | 12/1988 | Nelson et al. | |
| 4,986,762 A | 1/1991 | Keith | |

(List continued on next page.)

FOREIGN PATENT DOCUMENTS

| | | |
|---|---|---|
| AU | 40995/85 | 3/1985 |
| AU | 55314/86 | 3/1986 |
| DE | 27 35 106 | 8/1977 |
| DE | 33 08 682 | 3/1983 |
| EP | 0 146 478 | 12/1984 |
| EP | 0 149 250 | 12/1984 |
| EP | 0 196102 A | 10/1986 |
| EP | 0 211 208 | 2/1987 |
| EP | 0 406 151 | 1/1991 |
| EP | 0 479 226 | 4/1992 |
| EP | 0 196102 B1 | 3/1993 |
| EP | 0 538 164 | 4/1993 |
| FR | 2531576 | 2/1984 |
| FR | 2587127 | 3/1987 |
| JP | 59-74523 | 4/1984 |
| JP | 60-169811 | 9/1985 |
| JP | 61-55607 | 3/1986 |
| JP | 61-90104 | 5/1986 |
| WO | WO 91/10927 | 7/1991 |

OTHER PUBLICATIONS

ADC Telecommunications Next Generation Frame Product Family Ordering Guide, dated Oct. 1998.
ADC Telecommunications Next Generation Frame Product Family, dated Dec. 2000.
Northern Telecom Bulletin #91–004, Issue #2, May, 1991.
AT&T Product Bulletin 2987D–DLH–7/89, Issue 2, 1989.

*Primary Examiner*—John D. Lee
*Assistant Examiner*—Scott A Knauss
(74) *Attorney, Agent, or Firm*—Merchant & Gould P.C.

(57) ABSTRACT

The present invention relates to the management of cables extending to and from fiber termination blocks with sliding angled fiber adaptor modules within a fiber distribution frame.

21 Claims, 22 Drawing Sheets

U.S. PATENT DOCUMENTS

| | | |
|---|---|---|
| 4,995,688 A | 2/1991 | Anton et al. |
| 5,100,221 A | 3/1992 | Carney et al. |
| 5,129,030 A | 7/1992 | Petrunia |
| 5,142,606 A | 8/1992 | Carney et al. |
| 5,167,001 A | 11/1992 | Debortoli et al. |
| 5,289,558 A | 2/1994 | Teichler et al. |
| 5,335,349 A | 8/1994 | Kutsch et al. |
| 5,353,367 A | 10/1994 | Czosnowski et al. |
| 5,363,467 A | 11/1994 | Keith |
| 5,402,515 A | 3/1995 | Vidacovich et al. |
| 5,490,229 A | 2/1996 | Ghandeharizadeh et al. |
| 5,497,444 A | 3/1996 | Wheeler |
| 5,511,144 A | 4/1996 | Hawkins et al. |
| 5,570,450 A | 10/1996 | Fernandez et al. |
| 5,717,810 A | 2/1998 | Wheeler |
| 5,758,003 A | 5/1998 | Wheeler et al. |
| 6,097,872 A * | 8/2000 | Kusuda et al. ............... 385/134 |
| 6,236,795 B1 * | 5/2001 | Rodgers .................... 385/134 |
| 6,360,050 B1 * | 3/2002 | Moua et al. ................ 385/135 |

* cited by examiner

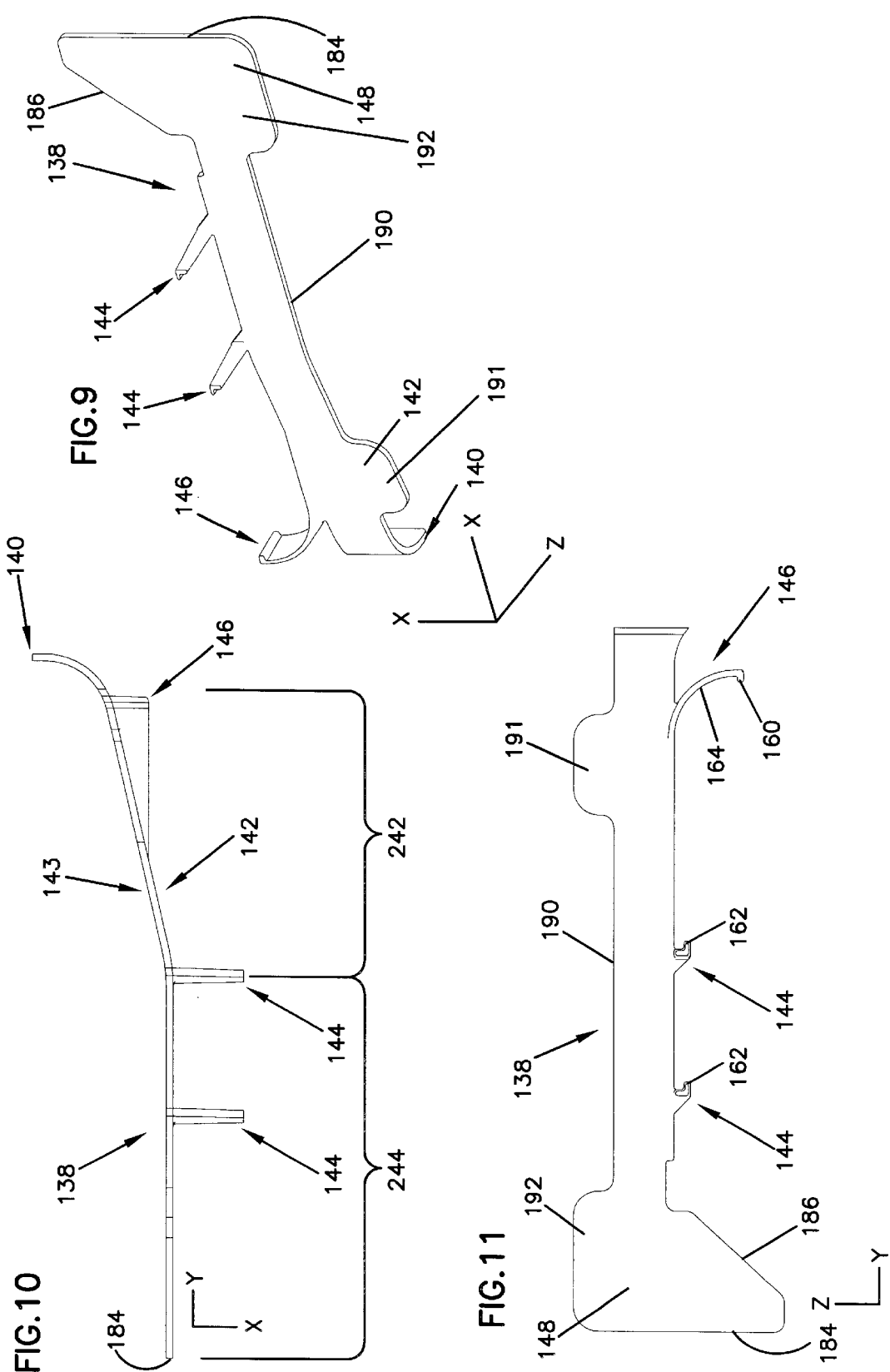

FIBER TERMINATION BLOCK WITH ANGLED SLIDE

FIELD OF THE INVENTION

The present invention relates to cable management for optical fiber termination systems. Specifically, the invention relates to terminations, and cable guides and troughs for managing the fiber optic cables extending to the terminations in frames, modules, blocks, and other fixtures.

BACKGROUND OF THE INVENTION

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Examples of this type of equipment are found in U.S. Pat. Nos. 5,497,444, 5,717,810 and 5,758,003. These patents disclose systems of high-density fiber distribution frames and high-density fiber termination blocks (FTBs) which are mounted to the frames. Because of the large number of optical fibers passing into and out of the FTBs, the frame and blocks have a variety of structures to organize and manage the fibers. Some structures are used to aid the fibers entering the back of the frame and FTBs. The FTBs include slideable modules to allow selective access to the densely packed terminations. Further structures are provided for managing the cables leaving the FTBs on the front. The front cables are typically cross-connect cables for connecting to other FTBs or other equipment. These cross-connect cables tend to be used in a much more dynamic fashion, whereas the rear cables tend to be much more static once initial installation is complete.

In an example fiber optic termination and cross-connection usage, there is often a pairing of FTBs, one connected to the outside plant fiber cable, and the other connected to the array of fibers linked to telecommunications devices throughout a facility. These FTBs would typically be mounted adjacent to one another in a fiber distribution frame, or mounted in neighboring distribution frames, in a facility switching area. Cross-connect cables are used to optically link the termination of an outside plant fiber in the outside plant FTB to the termination of a facility device fiber in the facility FTB. The cross-connect cable would be lead from the termination at one FTB through a series of cable guides, troughs and/or rings in the frame holding that FTB, through known structures for securing the slack in the cross connect cables, into the cable guides, troughs and/or rings in the frame holding the second FTB and end at the termination in the second FTB.

As new termination blocks and frames have been developed allowing ever higher levels of density of fiber, a need for better cross-connect cable management has been recognized. Concerns have arisen with respect to cables from terminations higher in the FTB hanging on top of and interfering with the movement of cables from terminations lower in the FTB. Also, cross-connect cables from FTBs mounted higher in the frame have longer lengths of cross-connect cables hanging in the vertical cable channels leading the cable out of the frame. The weight of these vertical lengths can exacerbate the interference problems caused by overhanging cables. These concerns can become magnified when coupled with the sliding modules incorporated into a high-density fiber distribution frame such as shown in the above-referenced patents.

The sliding of the modules to permit better access to the high density of fiber terminations inside a FTB requires that the cables attached to the terminations have some combination of slack and movement. When a cross-connect cable is attached to an FTB in a frame and the cable is led out of the FTB, through the cable guides, troughs and/or rings and into the vertical cable channel, much of the slack is pulled out of the cable by the weight of the cable hanging vertically in the channel. Therefore, some movement of the cables is necessary. But the cables attached to lower mounted modules in the FTB tend to be overlaid by the cables attached to higher mounted modules in the same FTB. The movement of the lower cables necessary to allow the modules to slide is hindered by the interference of the higher cables, making sliding of the modules difficult.

For the sliding modules themselves, cable pull can be an issue. Denser systems are desired, where the effects of cable pull are minimized. As the distances moved by the modules are increased, the problems of cable pull are increased as each module and the cables connected thereto are moved a greater distance relative to the FTB.

Further development in fiber termination systems is desired.

SUMMARY OF THE INVENTION

An aspect of this invention relates to a fixture for managing cables attached to adaptor modules. The adaptor modules slide relative to the fixture in a non-perpendicular direction angled relative to a longitudinal axis of the adaptor.

Another aspect of this invention relates to a fiber distribution frame with a plurality of fiber termination blocks with sliding cable adaptor modules mounted on the frame. The modules are mounted to the blocks to move in a non-perpendicular angled direction to manage cross-connect cables extending from the blocks. The modules may be configured in two groups which slide in an angled direction from opposite sides of the blocks. Cable guides may be mounted in corresponding relationship with the sliding adaptor modules adjacent to a front of the blocks. Cable slack storage is provided adjacent to a rear of the blocks.

A variety of advantages of the invention will be set forth in part in the detailed description that follows and in part will be apparent from the description, or may be learned by practicing the invention. It is understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 9 is a perspective view of the long fiber management guide shown in FIG. 6.

FIG. 10 is a front view of fiber management guide of FIG. 9.

FIG. 11 is a side view of fiber management guide of FIG. 9.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
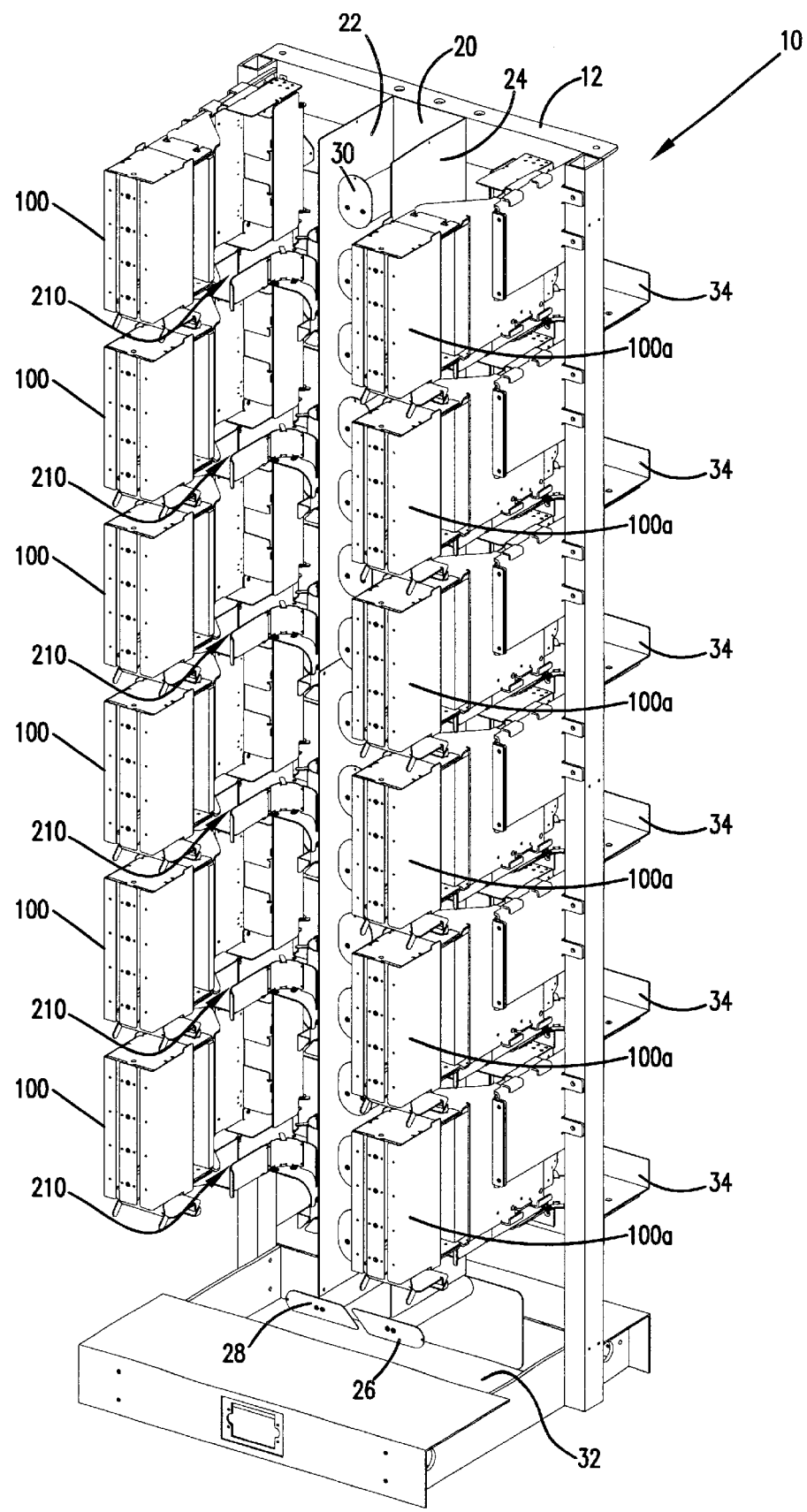
FIG. 1 is a front perspective view of a high-density fiber distribution frame with fiber termination blocks in accordance with the concepts of the present invention.
Figure 3:
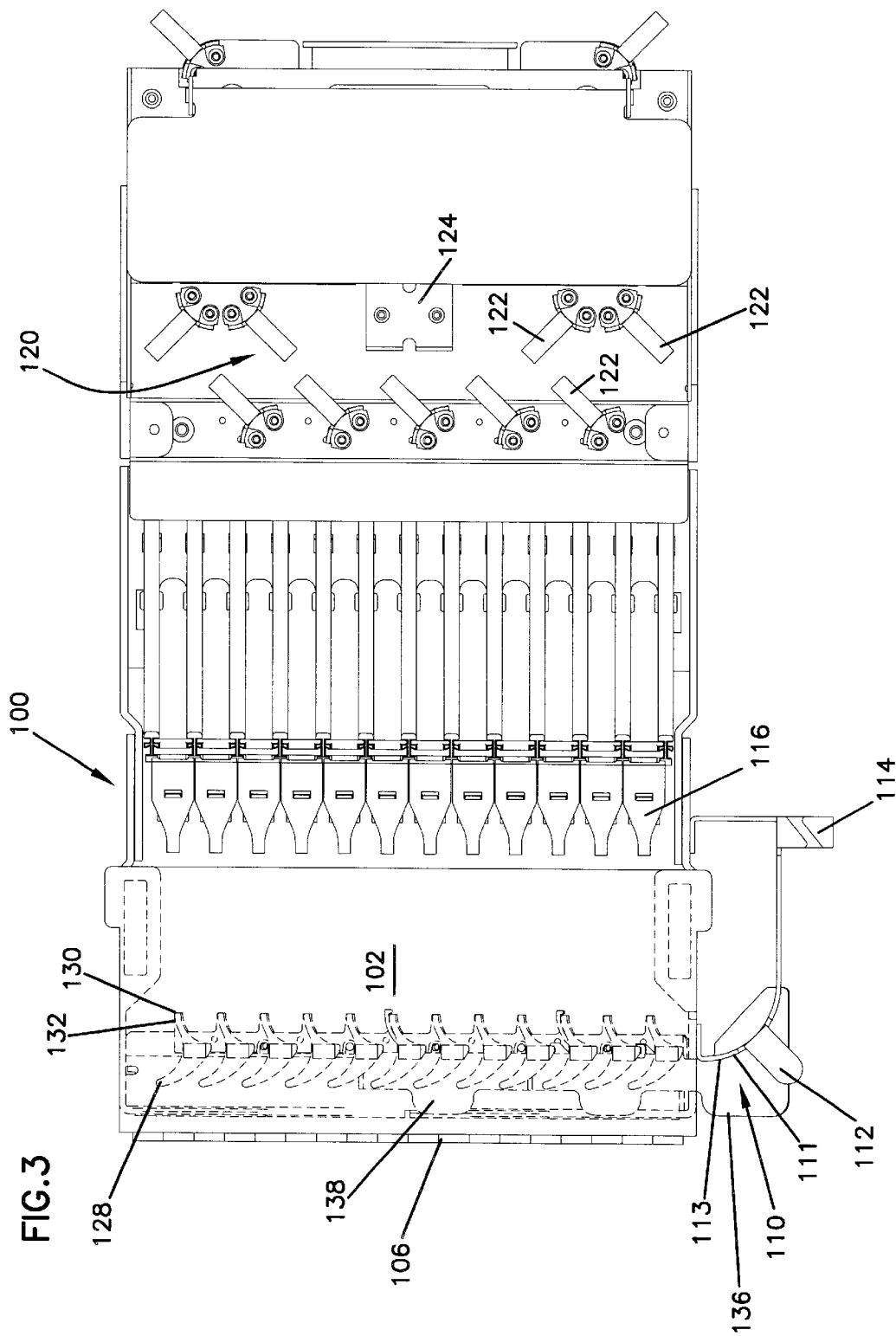
FIG. 3 is a side view of the fiber termination block of FIG. 2 with the front fanning guides and other interior structure shown as dashed lines.
Figure 5:
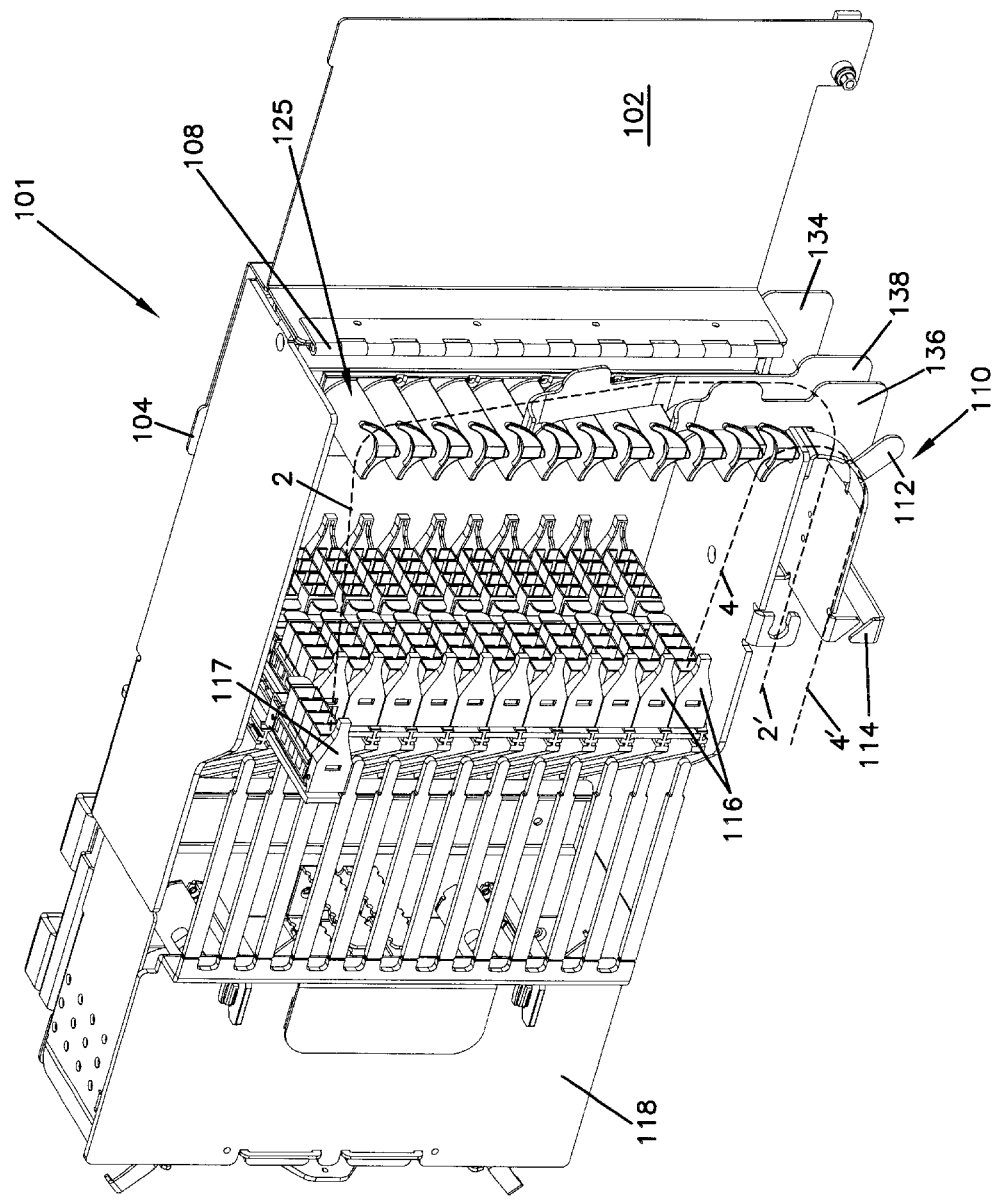
FIG. 5 is a front perspective view of a fiber termination block shown in FIG. 4 with one of the cross-connect cable covers open and one of the adaptor modules shown extended, and with dashed lines showing representative cable routing from the upper and lower adaptor modules.

Referring now to FIG. 1, a fiber distribution frame 10 is shown. A similar fiber distribution frame is the subject of U.S. Pat. No. 5,758,003, the disclosure of which is hereby incorporated by reference. Attached to fiber distribution frame 10 are twelve fiber termination blocks or fixtures, mounted in two vertical rows of six blocks 100 on the left side of frame 10 and six blocks 100a on the right side of frame 10. Located intermediately between these two rows of fiber termination blocks is a jumper storage trough 20 defined by sidewalls 22 and 24 and fiber distribution frame back 12. Within jumper storage trough 20 are a series of spools 30 for organizing and storing excess slack in cross-connect cables used to link between optical fiber terminations inside fiber termination blocks 100. These cross-connect cables are well known in the art and are not shown in most of the FIGS. in the interest of clarity. However, representative cables are shown in FIGS. 3 and 5. Below each fiber termination block 100 or 100a is a trough 210 for leading cross connect cables extending from a block 100 or 100a. Troughs 210 will be discussed in more detail below. At the lower end of trough 20 are radius limiters 26 and end caps 28 for assisting in the routing and management of the cross-connect cables and ensuring that minimum bend radius rules are not violated. Lower horizontal cable trough 32 allows cross-connect cables to pass from one row of fiber termination blocks 100, into jumper trough 20 if necessary and to the other row of fiber termination blocks, or from frame 10 to an adjacently mounted but not shown fiber distribution frame of similar nature and construction. Rear cable troughs 34 are shown on the back of frame 10 for managing and directing cables entering and exiting the rear of blocks 100 and 100a.

Note that fiber termination blocks 100 and 100a are essentially the same device, but mirror images of one another for mounting on the left and right side of a fiber distribution frame, respectively. Items specifically called out and identified for either block 100 or 100a should be understood to also apply to the other block unless otherwise specifically mentioned.

Figure 2:
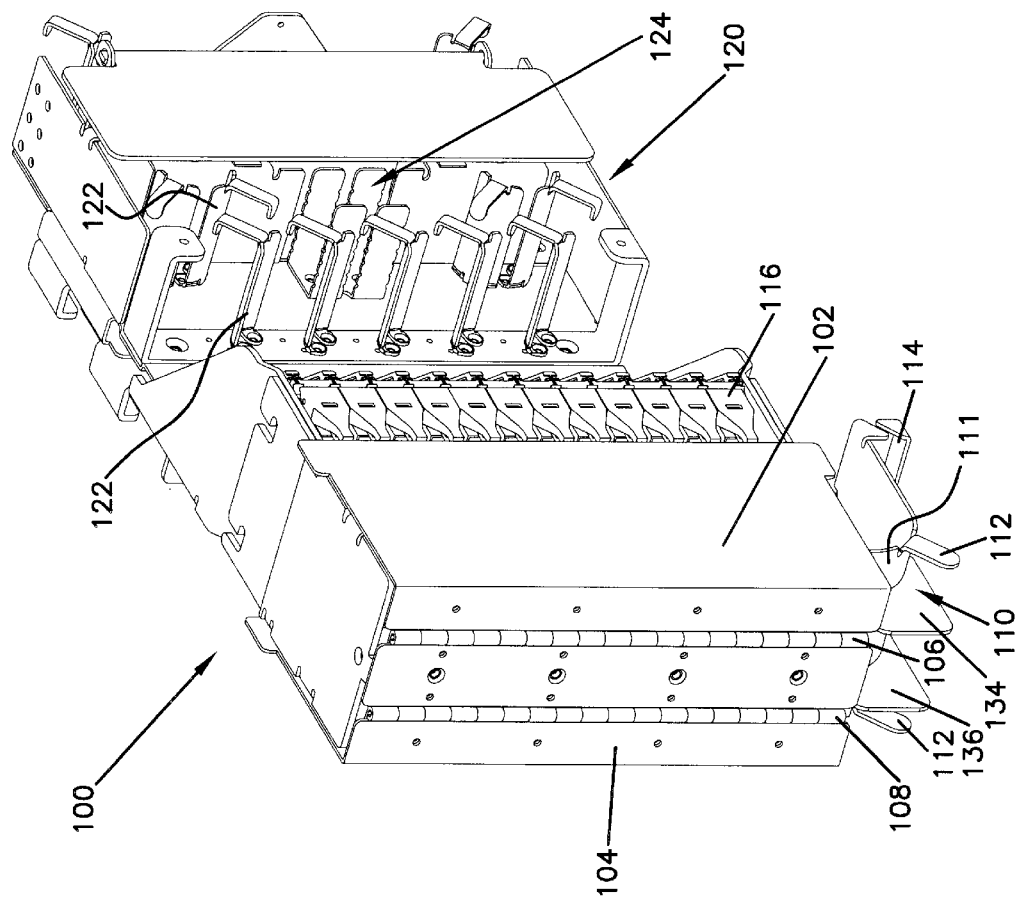
FIG. 2 is a front perspective view of a fiber termination block from FIG. 1 with the cross-connect cable cover in place.

Referring now to FIGS. 2 and 3, a fiber termination block 100 for mounting on the left hand side of a fiber distribution frame 10 is shown with rear cable management area 120 partially uncovered. Cross-connect cable covers 102 and 104 are mounted with hinges 106 and 108, respectively, at the front of block 100 Cable guide 110 extends down and toward the rear from the front of block 100 and includes radius limiter surface 111, side guides 112, slots 113 and rear guide 114. Radius limiter surface 111 ensures that cables transitioning from vertical to horizontal through cable guide 110 are not bent in a tighter radius than bend radius rules require. Slots 113 receive lower extension tabs 186 and 188 of cable management dividers 138 and 136, described in more detail below. Individual sliding adaptor modules 116 are mounted within block 100 and slide horizontally as shown. This horizontal sliding arrangement of adaptor modules 116 can be seen in the '003 patent. Alternatively, as shown in U.S. Pat. Nos. 5,497,444 and 5,717,810, the disclosures of which are hereby incorporated by reference, the block and modules can be configured to slide vertically. The rear cable management area 120 is shown without cables for clarity. Rear area 120 includes a series of cable managers with rear guides 122 having cable retention and bend radius protection features and a cable fanning strip holder 124. In case the cable entering the rear of block 100 is in the form of ribbon cable composed of 12 fibers, these ribbons will need to be fanned so that the individual fibers in the ribbon are broken into separate strands that can be connected to an adaptor and terminated at the back of a module 116. Fanning strip holder 124 is sized and shaped to hold such fanning strips.

Figure 4:
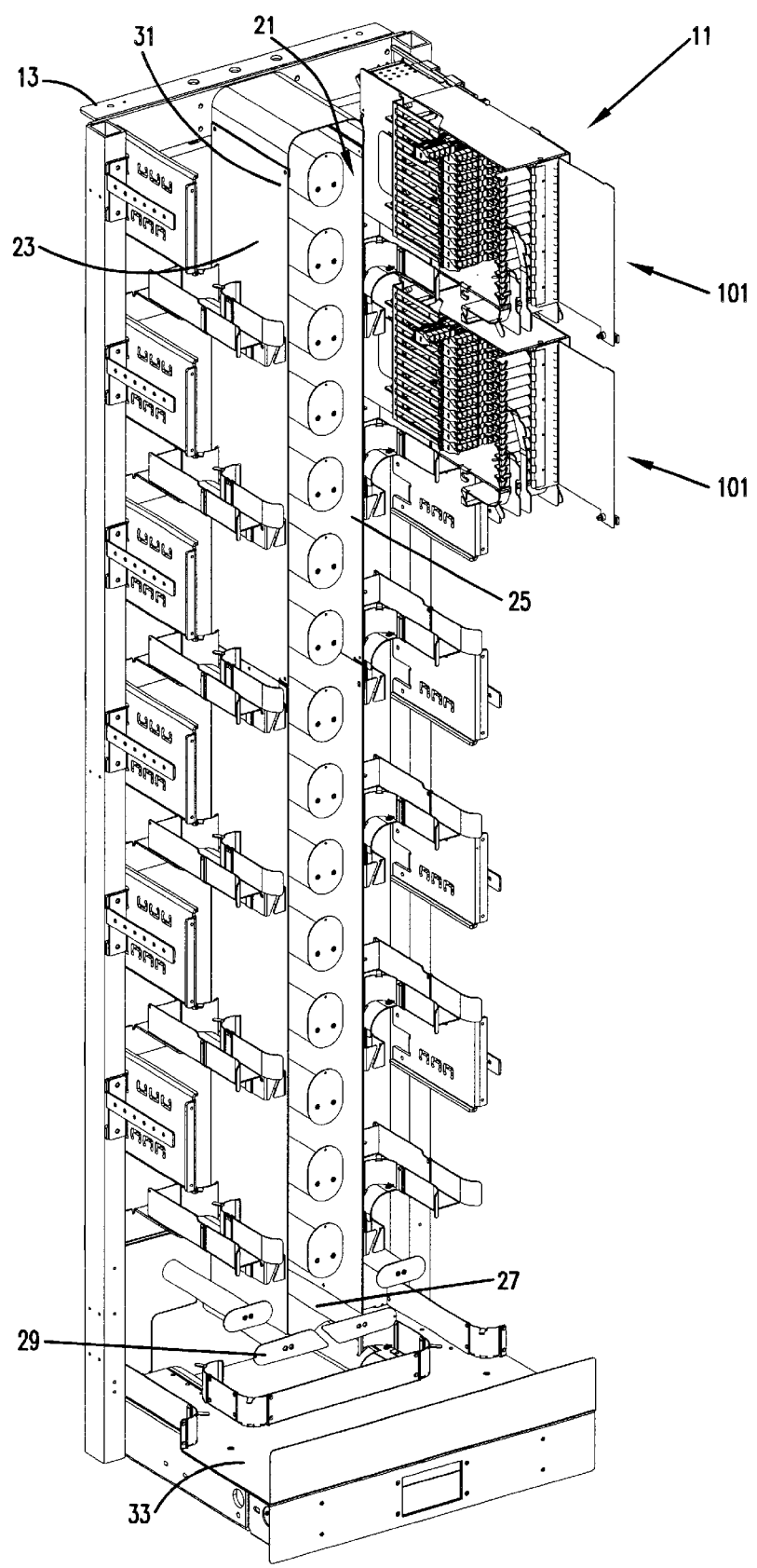
FIG. 4 is a front perspective view of an alternative embodiment of a high-density fiber distribution frame with two fiber termination blocks in accordance with the concepts of the present invention.

Referring now to FIG. 4, a second embodiment of a fiber distribution frame 11 is shown with two alternative embodiment fiber termination blocks 101 in place. Frame 11 is adapted for use where access is desired only from the front of the frame. No rear cable troughs are present and front trough 33 is deeper and wider. Frame 11 includes provisions for mounting a plurality of fiber termination blocks in two vertical rows in the same fashion as described above with regard to frame 10. These mounts are shown in more detail in FIG. 15, below. Located in the center of frame 11 is a jumper storage trough 21 defined by sidewalls 23 and 25 and fiber distribution frame back 13. Within jumper storage trough 21 are a series of spools 31 for organizing and storing excess slack in cross-connect cables used to link between optical fiber terminations inside fiber termination blocks 101. These cross-connect cables are well known in the art and are not shown in FIG. 4 in the interest of clarity. At the lower end of trough 21 are radius limiters 27 and end caps 29 for assisting in the routing and management of the cross-connect cables and ensuring that minimum bend radius rules are not violated. Lower horizontal cable trough 33 allows cross-connect cables to pass from one row of fiber termination blocks 101, into jumper storage trough 21 if necessary and to the other row of fiber termination blocks, or from frame 11 to an adjacently mounted but not shown fiber distribution frame of similar nature and construction.

Figure 6:
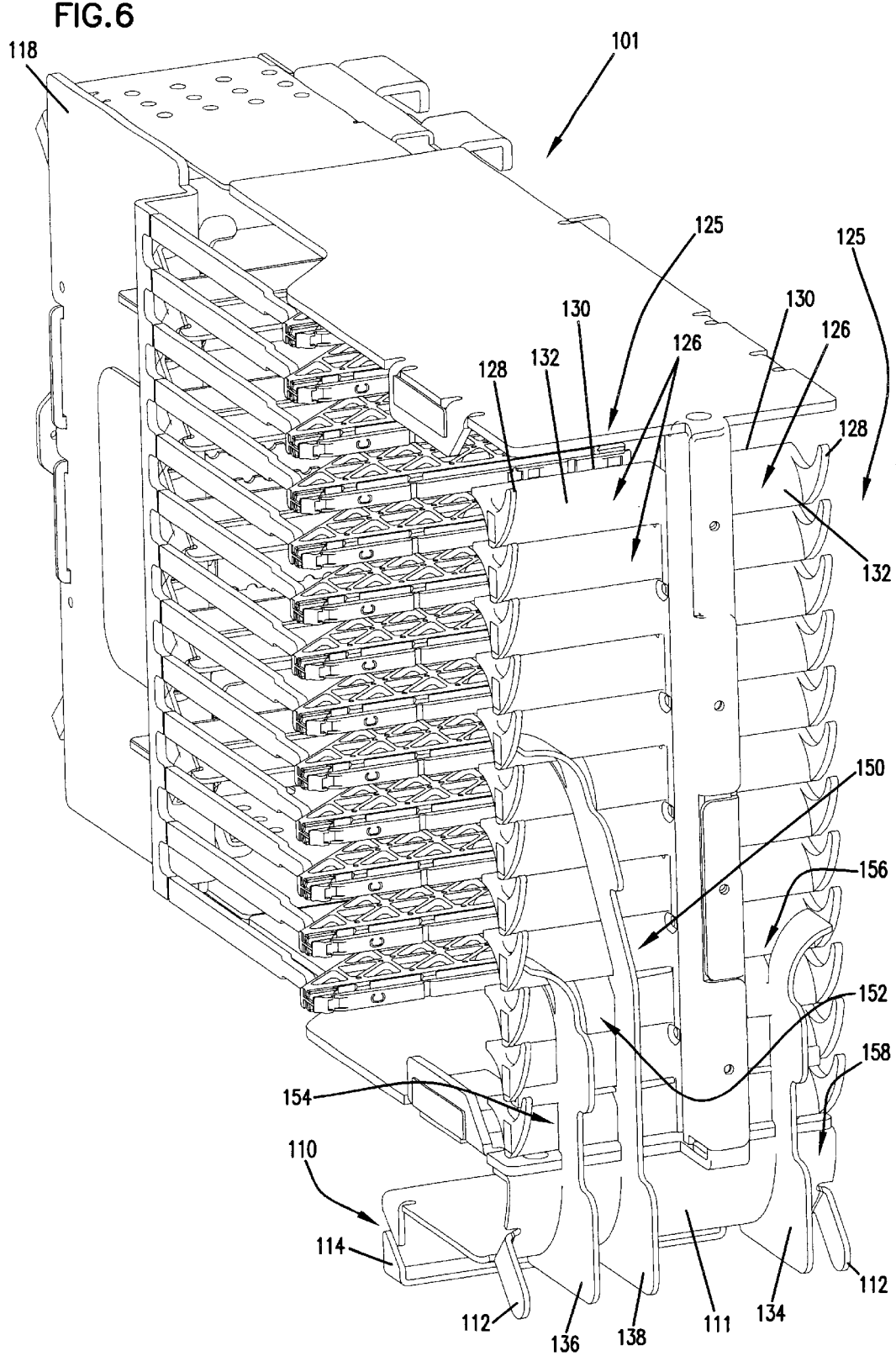
FIG. 6 is a perspective view of the fiber termination block of FIG. 5 with adaptor modules and cross-connect cable covers removed.
Figure 7:
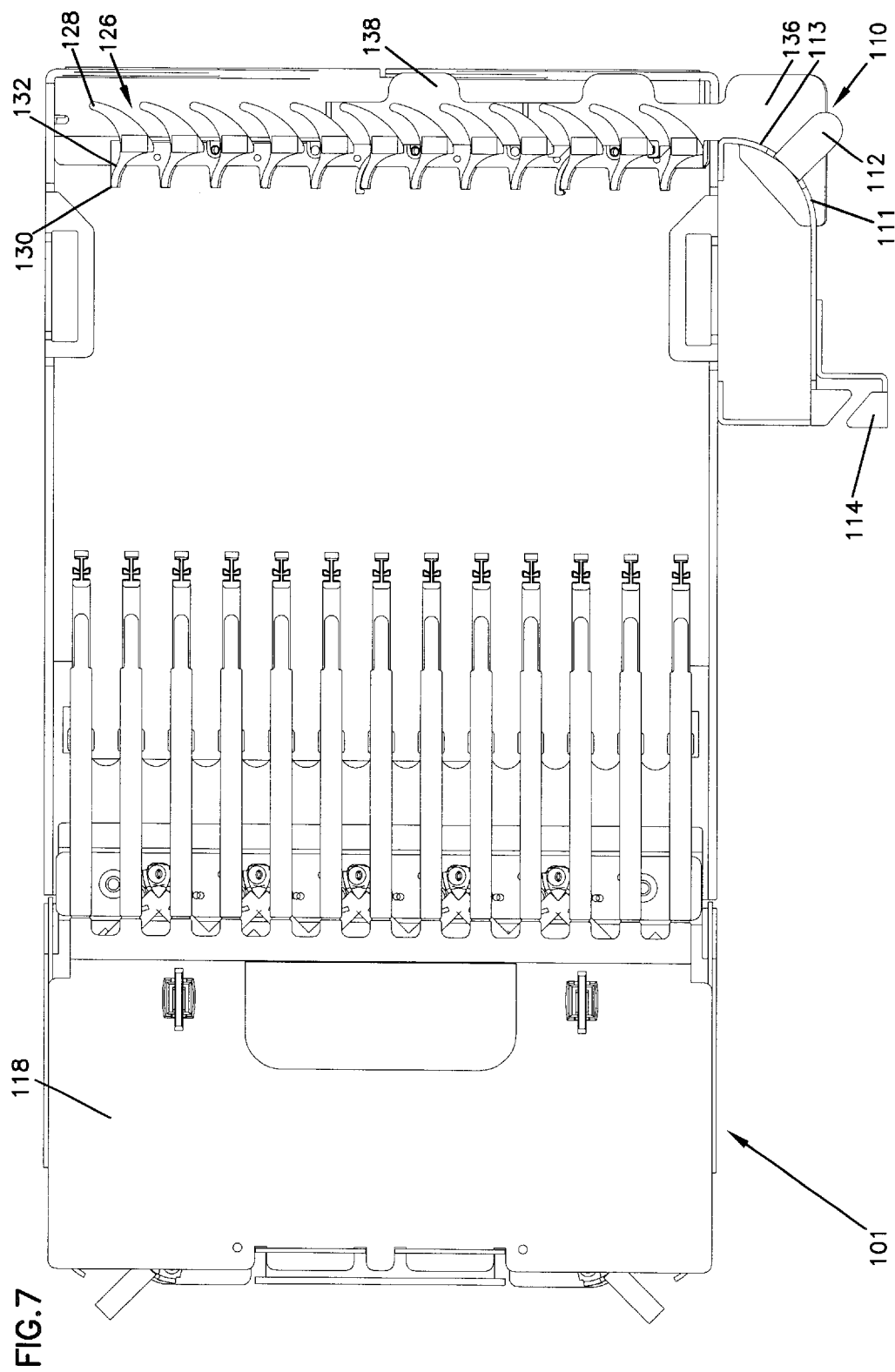
FIG. 7 is a side view of the fiber termination block of FIG. 6.
Figure 8:
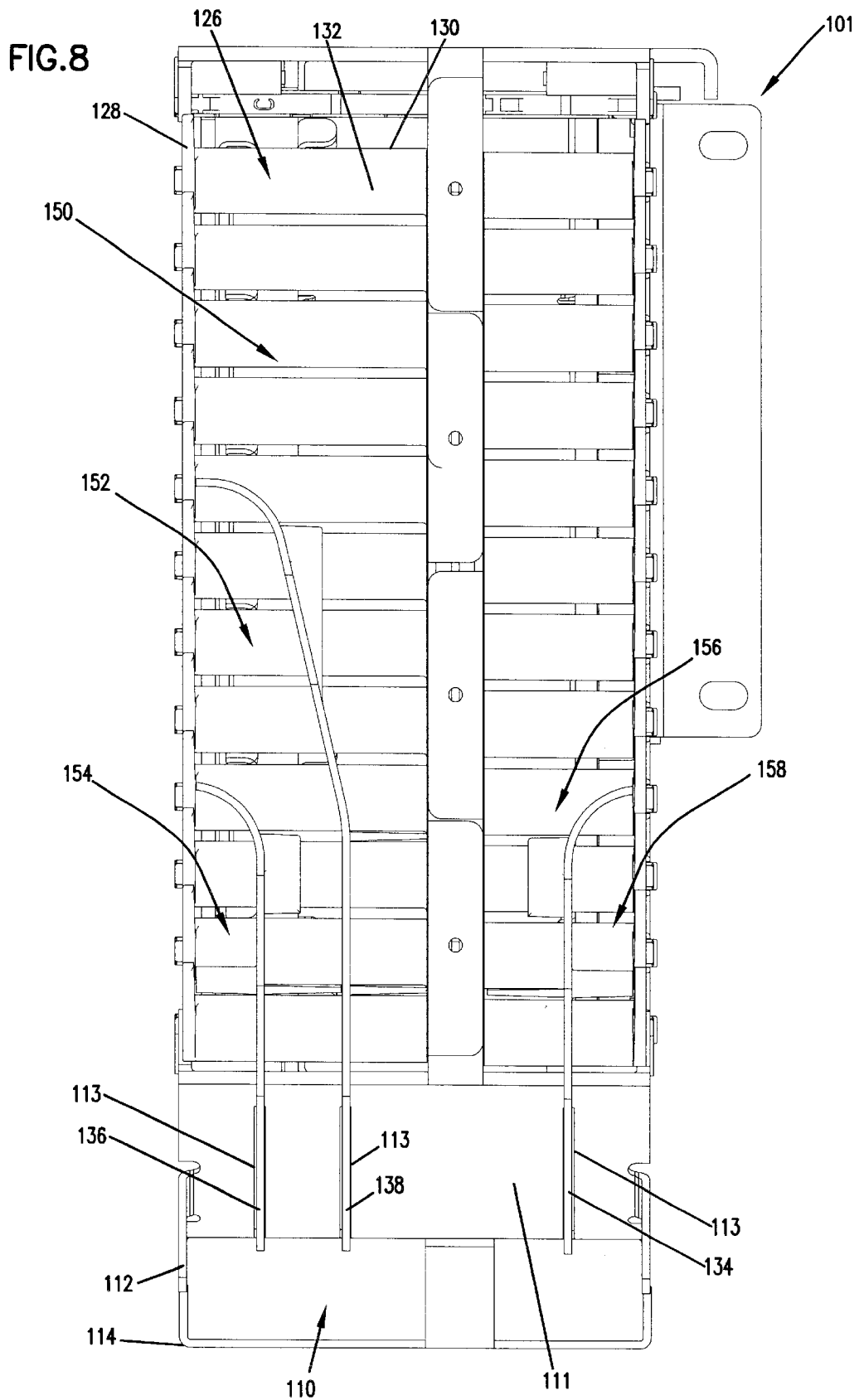
FIG. 8 is a front view of the fiber termination block of FIG. 6.

Referring now to FIGS. 5 though 8, fiber termination block 101 is shown with the rear cover 118 in place over the rear cable management area 120. Fiber termination block 101 differs from fiber termination block 100a slightly but both perform the same function. The two blocks 101 and 100a have different housings designs and are designed to have different numbers of adaptors mounted on each module 116. In FIG. 5, modules 116 are shown with one module 117 shown extended to the limit of its movement along its line of travel. In FIGS. 6 though 8, modules 116 have been removed from for clarity, as have the cross-connect cable covers 102 and 104. Seen on the front of block 101 are front fanning devices 125. Each device 125 is composed of fanning guides 126 including side shields 128, upper edges 130 and rounded surfaces 132. Each of these front fanning devices 125 is mounted to block 101 so that each upper edge 130 of each fanning guide 126 is approximately level with and parallel to a module 116. Cross-connect cables are connected to adaptors mounted on module 116, passed over side shield 128 so that the cable drapes across upper edge 130 and down surface 132. The cable is then directed between side guides 112 and through rear cable guide 114. At this point, the cross-connect cable is passed into the cable trough which is integral to the fiber distribution frame 10 and which will be discussed in more detail below.

Mounted to front fanning guides 126, on the side opposite from modules 116 are cable management dividers 134, 136 and 138. These dividers organize the cross-connect cables extending from modules 116 across front fanning guides 126 into distinct vertical paths. As shown in the FIGS., the upper surface of divider 138 defines an essentially vertical channel 150 for cables from the upper group of modules 116. The lower surface of divider 138 and the upper surface of divider 136 define an essentially vertical channel 152 for cross-connect cables from the middle group modules 116. And the lower surface of divider 136 defines an essentially vertical channel 154 for cross-connect cables from the lower group of modules 116. Divider 134 defines two essentially vertical channels on the on the right side of block 101, channel 156 for cables from the higher mounted modules and channel 158 for cables from the lower mounted modules. Dividers 134 and 136 are the same basic size and shape except that they are mirror images of each other. As shown, both dividers 134 and 136 are mounted to the front fanning guides 126 which are located in front of the fourth modules from the bottom of block 101, so that cables from the lower three modules pass into the channels 158 and 154, respectively. Divider 138 is mounted to the front fanning guide 126 in front of the eighth module from the bottom, so that cables from the upper five modules are directed into channel 150. The cables from the fourth to the seventh modules from the bottom are directed into channel 152. A divider 140, not shown, is a mirror image version of divider 138 and would be used where cable densities are high enough on the right side of a block 100 or 101 to require a pair of dividers be used. As shown in FIGS. 5 through 8, block 101 has a higher number of adaptors and therefore cross-connect cables on the left side than on the right side. For these illustrated fiber termination blocks, the side with the higher density of cables will have a greater need to keep cables from the upper modules from interfering with the cables from the lower modules. Thus, two dividers are provided. The side with the lower density of cables will not have as great a problem with cable interference and thus only a single divider is shown. The number of dividers provided for a particular fiber termination block will depend on the density of cables extending from modules 116 through front fanning device 125 and into cable guide 110.

As illustrated in FIGS. 5 through 8, the higher density side of each block provides for twelve modules 116 each having six adaptors mounted thereon. The lower density side of each block in these FIGS. provides for twelve modules 116 each mounting four adaptors. Other configurations are contemplated, including six, twelve or eighteen rows of modules 116. The lowest density contemplated for a fiber termination block according to this design consists of four adaptors mounted to single side of a block 100, 100a or 101. It is anticipated that this alternative would only require a single divider 134 or 136 on that side, as shown on the right side of FIGS. 4 through 6. Alternatively, a higher density of six adaptors on each side is anticipated for a block 100, 100a or 101. It is anticipated that this alternative would require a pair of dividers 134 and 140 on the right side, and a pair of dividers 136 and 138 on the left side. Higher levels of density, including eight or more adaptors per side of a fiber termination block are also anticipated and these higher densities in conjunction with up to eighteen rows of modules 116 might make a third cable divider in accordance with the principles of this invention to be mounted on the front fanning device 125 desirable.

Also shown in FIG. 5 are two representative cable routes, shown as dashed lines. Route 2 extends from module 117 and illustrates thee path a cable connected to an upper module would follow: through front fanning device 125 and into a channel defined by divider 138, into cable guide 110, between side guides 112, and through rear guide 114 into a trough attached to frame 11, which is described in more detail below. Route 4 extends from the lowest module 116, through the front fanning device 125 and into a channel defined by divider 136, into cable guide 110, between side guides 112, and through rear guide 114 into a trough attached to frame 11, which is described in more detail below.

Referring now to FIGS. 9 through 11, further details of divider 138 are shown. Note that axes designations are included in each FIG. and that these axes designations are consistent among the FIGS. As described above, divider 138 is sized and shaped to provide separate channels for the cross-connect cables from the higher mounted modules to be routed down through once these cables pass through front fanning devices 125. Divider 138 extends from a first end 140, to a second end 184, and with the exception of the mounting structures 144 and 146, is generally planar along the z-axis. This first end 140 is curved as shown to promote the smooth transition of cables from the left side of modules 116 into channel 150 which is defined on the right side of the front of block 101. First major surface 142 defines the left limit of channel 150 and second major surface 143 defines the right limit of channel 152. These two major surfaces 142 and 143 are generally planar along the z-axis. First major surface 142 may be divided into sections 242 and 244, where section 244 is lies generally parallel to the y-axis and section 242 is angled from the y-axis to cooperate with the curve of first end 140 to promote the smooth transition of cables from the left side of modules 116 into channel 150.

Mounting structures or clips 144 and 146 are sized and shaped to permit divider 138 to be mounted to the front of front fanning guides 126. Clips 144 and 146 extend along the x-axis and are essentially perpendicular with first major surface 142. Clip 146 includes a lip 160 and a curved surface 164. Curved surface 164 is arced about the z-axis and is shaped to coincide with the shape of curved surface 132 of a front fanning guide 126. Lip 160 runs parallel to the x-axis and is sized and shaped to engage upper edge 130 of front fanning guide 126. Lower clips 144 include a lip 162, parallel with lip 160, for engaging the lower edge of a front fanning guide 126. When divider 138 is mounted to a block 101, extension 148 at second end 184 extends into cable guide 110 at the bottom of the front of block 101. Tab 186 of extension 148 is sized and shaped to engage a tab 113 on radius limiter surface 111 when divider 138 is mounted on front fanning guides 126. Outer edge 190 is the edge opposite the mounting clips 144 and 146 and extends generally along the y-axis. On this edge are defined two tabs 191 and 192. These tabs 191 and 192 cooperate with cross-connect cable cover 102 to more fully enclose channel 150 when cable cover 102 is closed, while allowing easy access to the cables within channel 150 when cable cover 102 is open.

Figure 12:
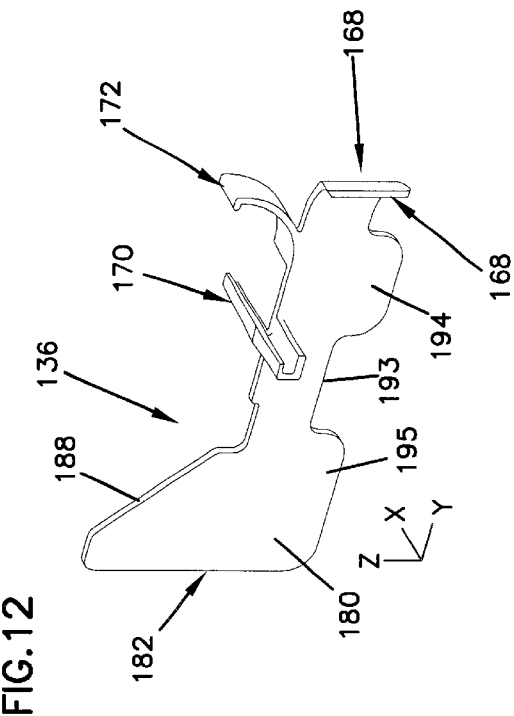
FIG. 12 is a perspective view of the short fiber management guide shown in FIG. 6.
Figure 13:
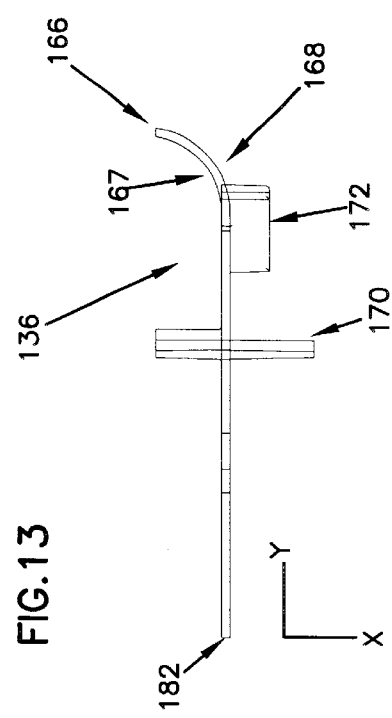
FIG. 13 is a front view of fiber management guide of FIG. 12.
Figure 14:
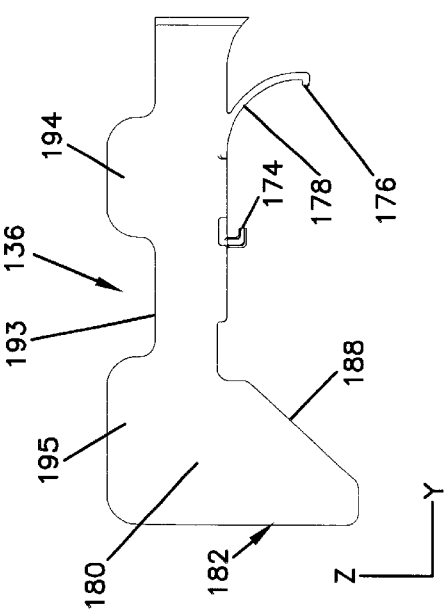
FIG. 14 is a side view of fiber management guide of FIG. 12.

Referring now to FIGS. 12 though 14, the details of divider 136 are shown. Note that axes designations are included in each FIG. and that these axes designations are consistent among the FIGS. As described above, divider 136 is sized and shaped to provide separate channels for the cross-connect cables from the lower mounted modules to be routed down through once these cables pass over the front fanning dividers. Divider 136 extends a first end 166 to a second end 182, and with the exception of the mounting structures 170 and 172, is generally planar along the z-axis. First end 166 is curved as shown to promote the smooth transition of cables from the left side of modules 116 into channel 152 which is defined on the right side of the front of block 101. First major surface 168 defines the left limit of channel 152 and second major surface 167 defines the right limit of channel 154. These two major surfaces 168 and 167 are generally planar along the z-axis.

Mounting structures or clips 170 and 172 are sized and shaped to permit divider 136 to be mounted to the front of front fanning guides 126. Clips 170 and 172 extend along the x-axis and are essentially perpendicular with first major surface 168 and second major surface 167. Clip 172 includes a lip 176 and a curved surface 178. Curved surface 178 is arced about the z-axis and is shaped to coincide with the shape of curved surface 132 of a front fanning guide 126. Lip 176 runs parallel to the x-axis and is sized and shaped to engage upper edge 130 of front fanning guide 126. Lower clip 170 includes a lip 174, parallel with lip 176, for engaging the lower edge of a front fanning guide 126. When divider 136 is mounted to a block 101, extension 180 at second end 182 extends into cable guide 110 at the bottom of the front of block 101. Tab 188 of extension 180 is sized and shaped to engage a tab 113 on radius limiter surface 111 when divider 136 is mounted on front fanning guides 126. Outer edge 193 is the edge opposite the mounting clips 170 and 172 and extends generally along the y-axis. On this edge are defined two tabs 194 and 195. These tabs 194 and 195 cooperate with cross-connect cable cover 102 to more fully enclose channel 152 when cable cover 102 is closed, while allowing easy access to the cables within channel 152 when cable cover 102 is open.

Figure 15:
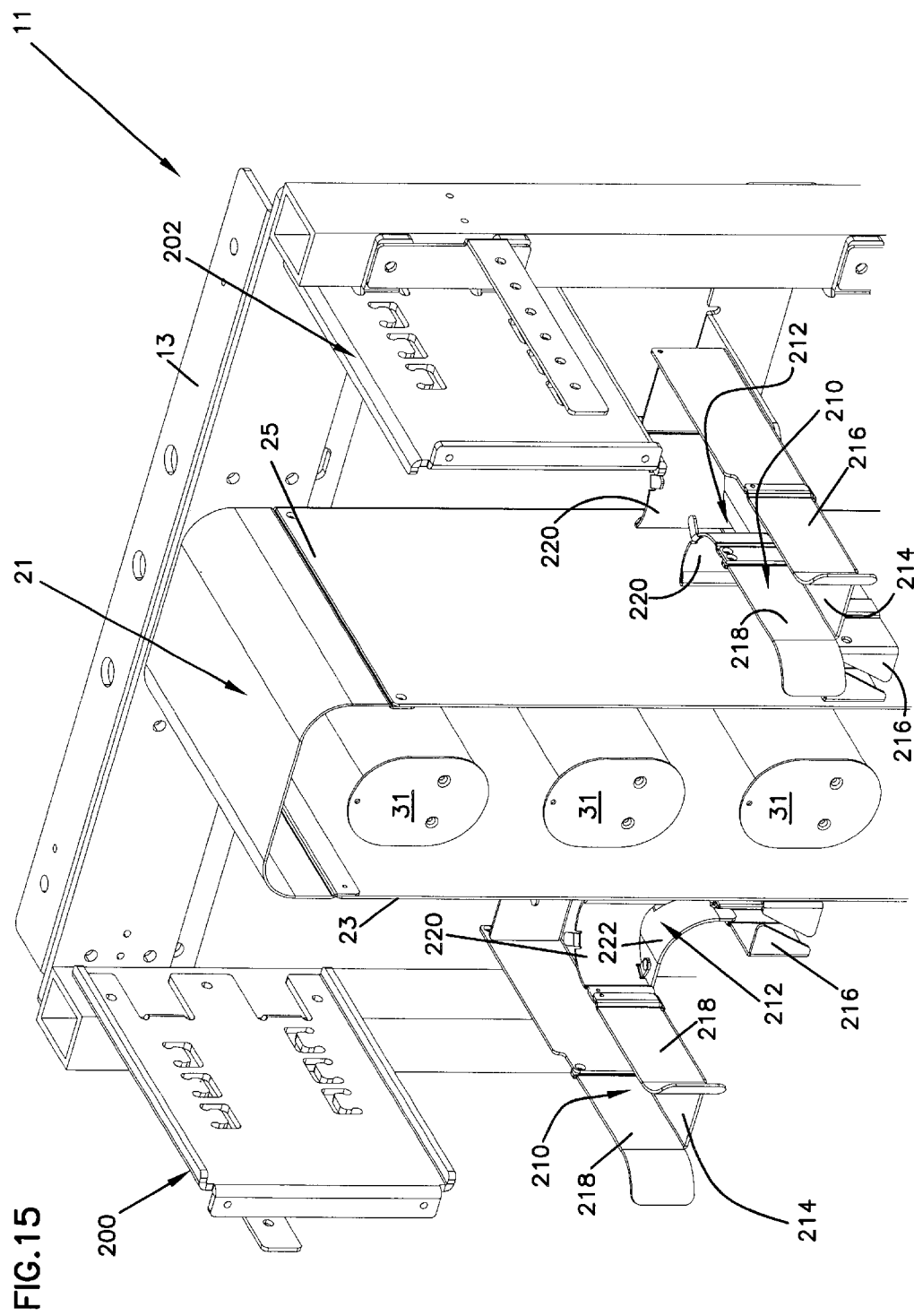
FIG. 15 is a perspective view of the upper portion of the fiber distribution frame of FIG. 4 with the fiber termination blocks removed to show the cable troughs.

Referring now to FIG. 15, the upper portion of frame 11 from FIG. 4 is shown in more detail. Fiber termination blocks 100 and 101 have been removed from this frame for clarity. Fiber termination block mounts 200 and 202 are attached to the frame on opposite sides and allow blocks 100 and 101 to be mounted to the frame. Horizontal cable troughs 210 are mounted to frame 10 so that, when a block 100 or 101 is mounted to frame 10, the cross-connect cables passing through rear cable guide 114 are directed into horizontal trough 210. Horizontal trough 210 extends from front to back within frame 10 and is designed to direct cross-connect cables exiting from a block 100 or 101 into cable down trough 212, which in turn directs the cross-connect cables into vertical cable guide 216 for routing to lower trough 32 at the base of the frame. Trough floor 214 and opposed vertical-trough sides 218 define horizontal trough 210. The top of horizontal trough 210 is left open for ease of cable management. Curved sidewalls 220 permit the cross-connect cables to transition from horizontal trough 210 into down trough 212 without violating bend radius rules.

Often, when a cross-connect cable is routed through the series of troughs in a frame 10, the weight of the vertical run of the cable within vertical cable guides 216 serves to draw all slack out of the cable inside fiber termination block 100 or 101. This is undesirable, since some cable slack is necessary to permit easy handling of cables within the fiber termination block 100 or 101. The interior surfaces of trough bottoms 214, trough sides 218, and down trough bottom 222 are therefore coated with a high friction coating or otherwise provided with a high friction producing surface when in contact with cable jackets. In the embodiment shown in FIG. 15, this coating is in the form of non-skid paint applied to the parts during production. Other options for providing such a high friction surface include adhesive rubber panels sized and shaped to fit within pre-existing frames to permit retrofitting of the older frames with this invention, as well as to enable new frames to be built in accordance with this invention. Other surface treatment techniques appropriate for the manufacturing process used to produce the components of the troughs are also anticipated.

Figure 16:
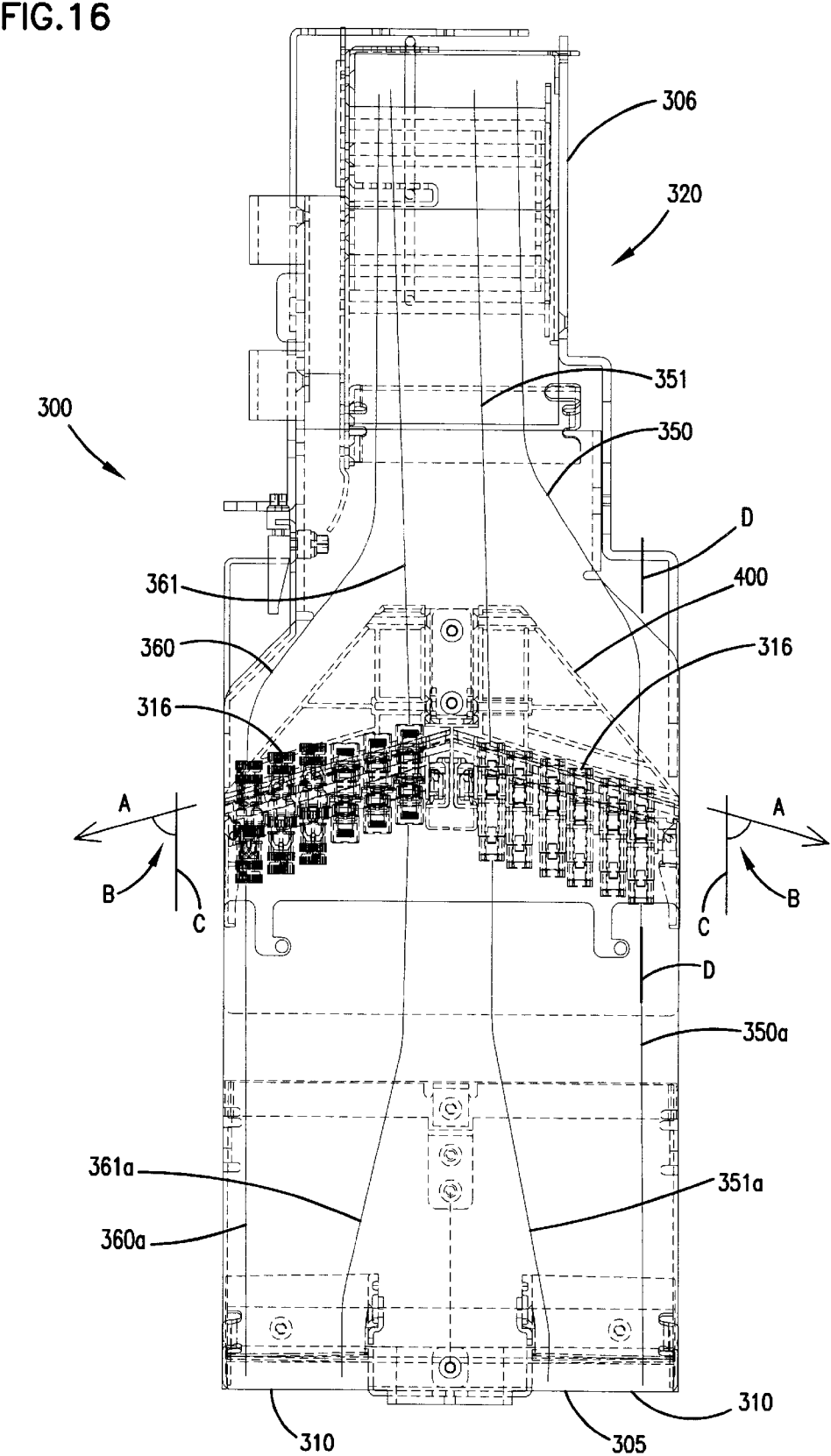
FIG. 16 is a top view of an alternative fiber termination block showing internal structures in hidden lines, and representative cables.
Figure 17:
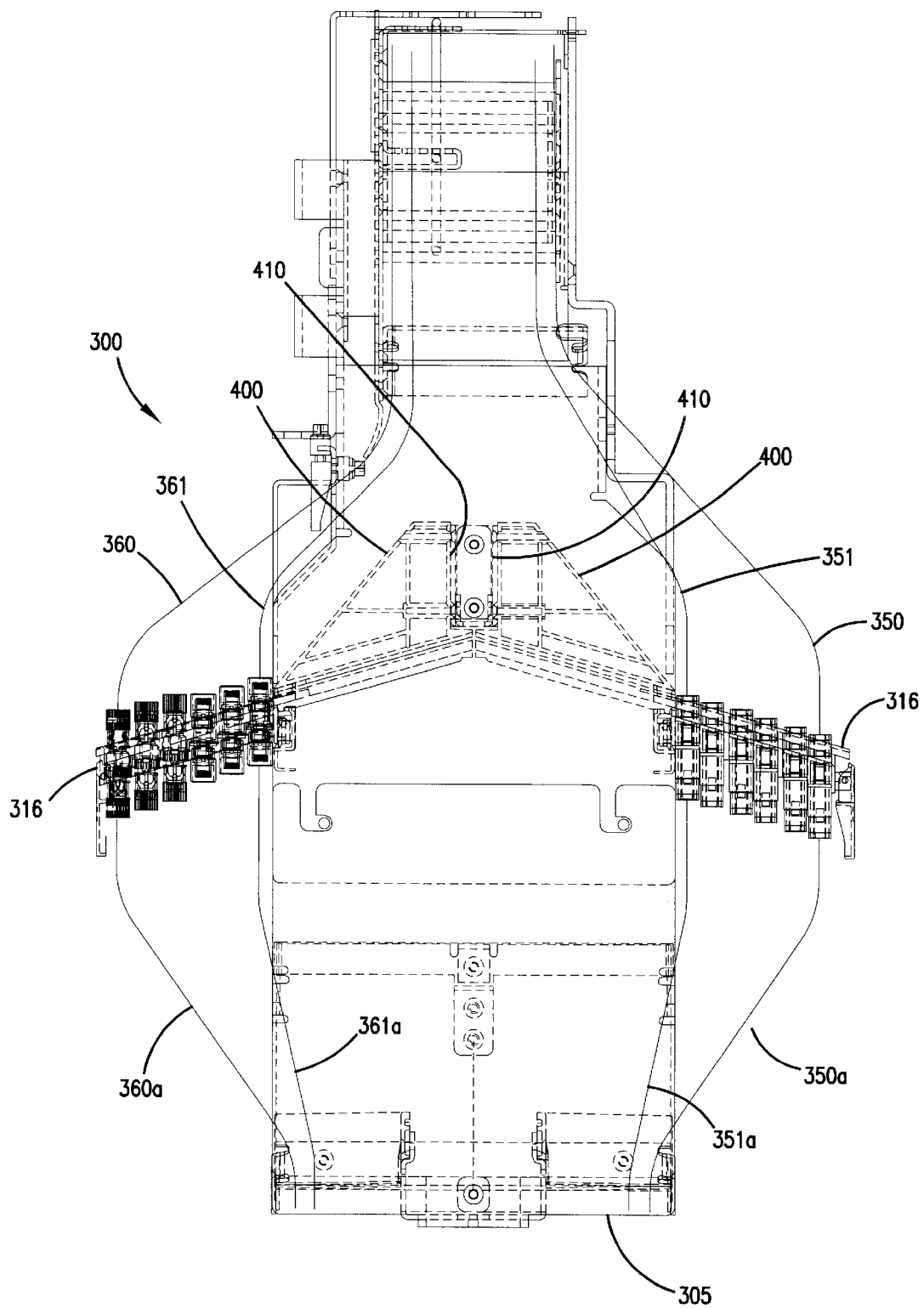
FIG. 17 is a top view like FIG. 16 with two modules pulled to extended positions on opposite sides of the fiber termination block, and with the front covers removed.

Referring now to FIGS. 16 and 17, a further embodiment of a fiber termination block 300 is shown. Fiber termination block 300 includes sliding adaptor modules 316 which slide at an angle relative to the longitudinal axis 303 of each connector and adaptor. Modules slide from opposite sides of the block in the direction of arrow A which is toward the front end 305, and away from the rear end 306. The modules 316 move forward toward the front of the fiber termination block 300 as they are moved from the retracted to the extended positions. See FIGS. 16 and 17. The forward movement maintains the slack in the installed fibers on the front of the fiber termination block 300, and eliminates the cables pulling tight or adding side load to the adaptors and connectors. The forward movement is preferred for larger modules, like modules 316 which each contain six terminations. A preferred angle B relative to the axis C is between about 70–75 degrees, more preferably 73 degrees.

The rear cables, represented by cables 350, 351, 360, 361 terminate at modules 316. The front cables, or cross-connect cables, represented by cables 350a, 351a, 360a, 361a extend from the terminations at modules 316 toward front fanning guide 326 and cable guide 310, as noted above for blocks 100, 101. Adaptors 340 hold the connector ends of each cable to allow for optical signal transmission. The adaptors 340, and the mated connectors define an axis D. All the axes D are parallel to block axis C.

Figure 18:
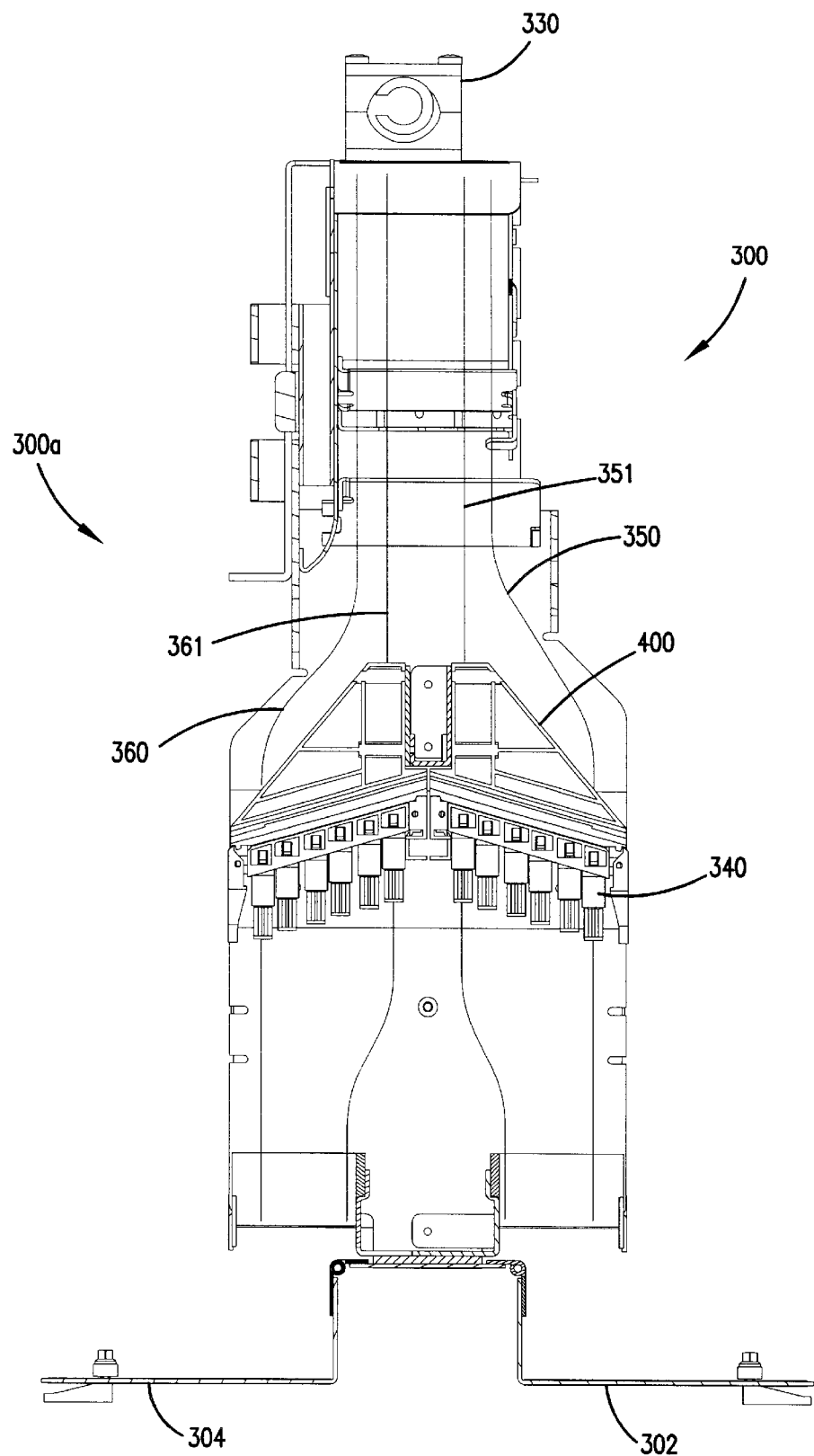
FIG. 18 is a top cross-sectional view like FIG. 16, with the front hinged covers in the open positions, and showing a rear cable clamp.
Figure 19:
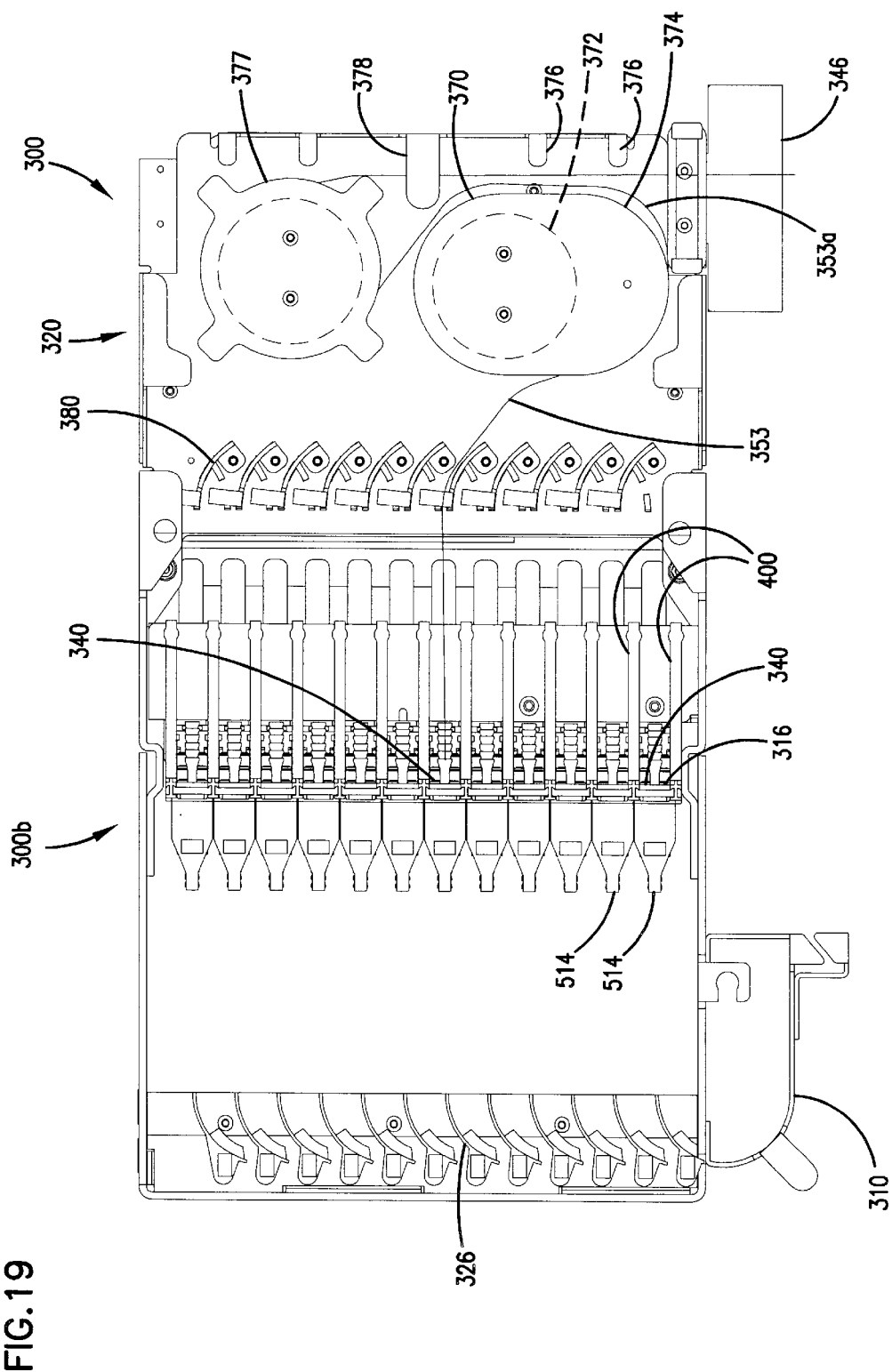
FIG. 19 is a side view of the fiber termination block of FIG. 16 with the rear cover and the front cover removed, and showing a representative cable pathway entering the fiber termination block from the bottom.
Figure 20:
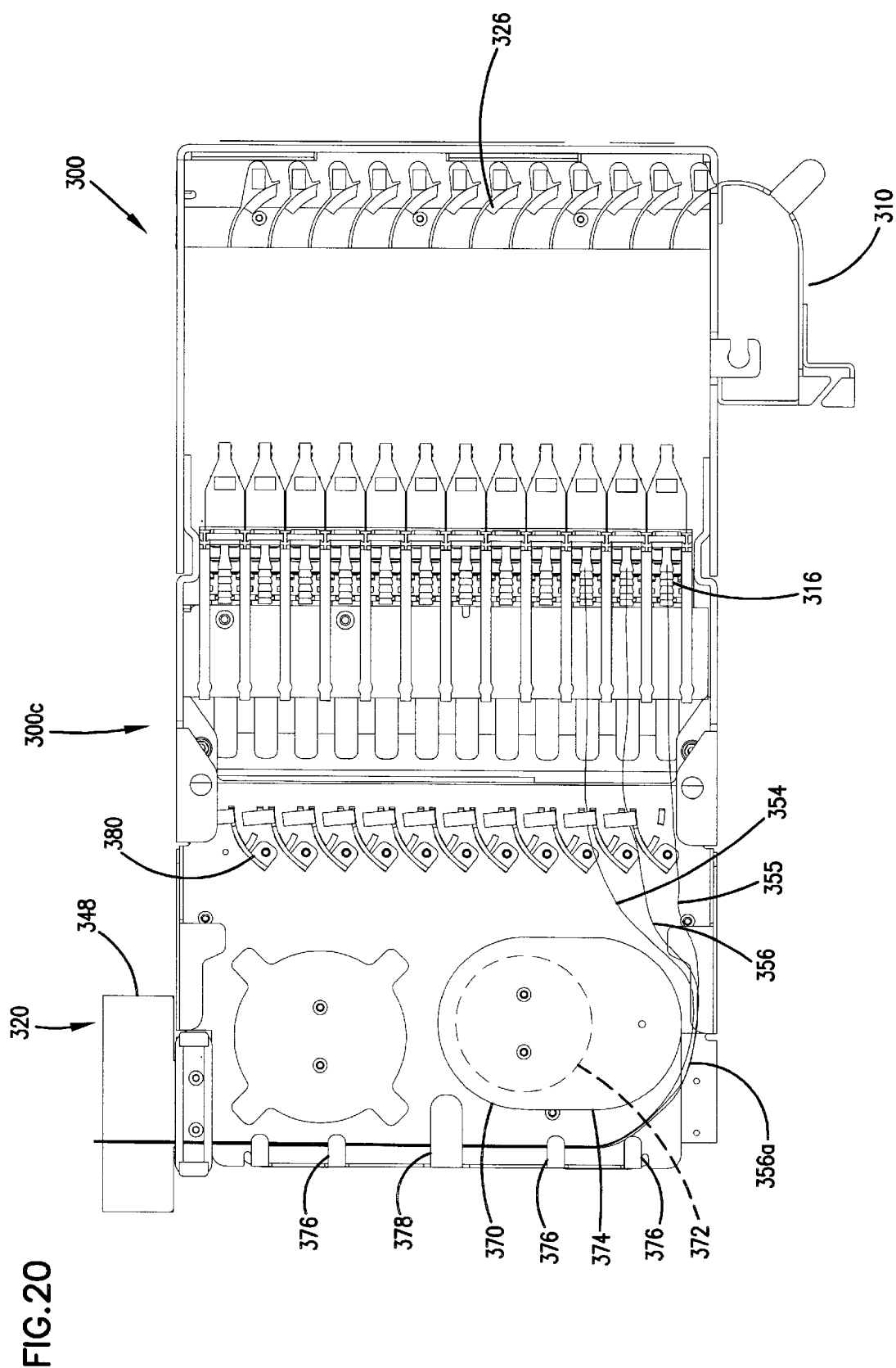
FIG. 20 is a side view of a fiber termination block similar to the fiber termination block of FIG. 19, but for an opposite side of the fiber distribution frame, and showing representative cables entering the fiber termination block from the top.

Rear cables enter the fiber termination block in a variety of manners. The cables may enter from the bottom or from the top. Individual cables may be delivered to the block, or a jacketed cable of fiber bundles may be delivered to the block for fanning within the block. Fiber termination block 300a in FIG. 18 shows a rear cable clamp 330 typically used for jacketed intrafacility cable (IFC) 332. See also FIG. 21. For fiber optic termination cables, they may enter from the bottom (block 300b, cable 353 in FIG. 19), or from the top (block 300c, cables 354–356 in FIG. 20). Clamps 346, 348 clamp the incoming cables to blocks 300b, 300c.

Adjacent rear area 320 of the fiber termination block 300, a slack loop in the fibers is provided, such as through the use of a spool 370. See FIGS. 19 and 20. The slack loop 353a, 356a provides the extra fiber length needed when the angled sliding modules are moved out and forward to access the adaptors 340. Spool 370 includes a cylindrical base 372, and an offset spaced flange 374. In block 300b, a further upper spool 377 is used to loop the incoming cable downward for termination at adaptors 340. Additional guide fingers 376, 378 are provided to help retain the cables. Rounded guide fingers 380 of cable fanning guide 342 help direct the cables from spool 370 to the adaptor modules 316.

Figure 21:
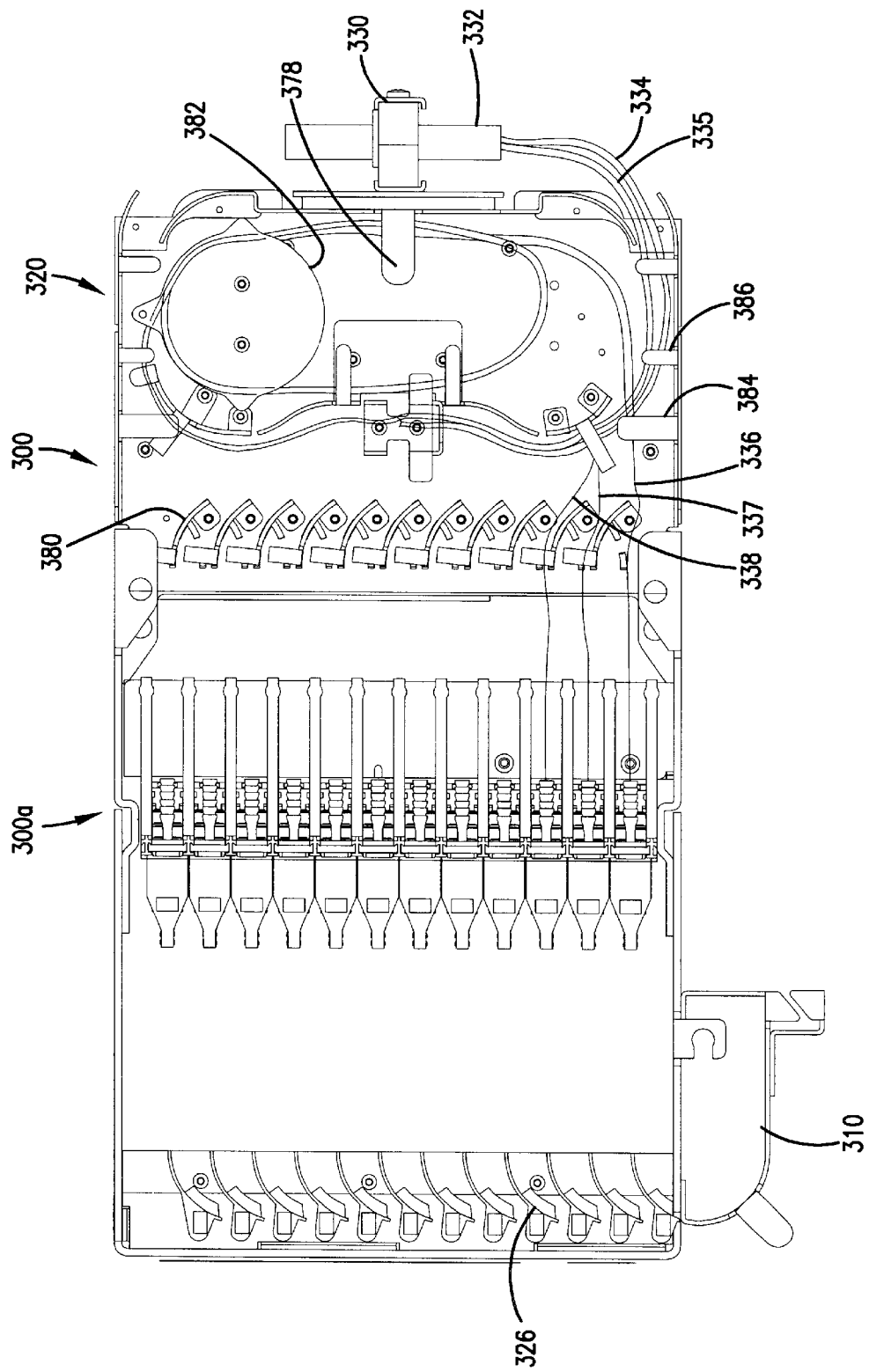
FIG. 21 is a side view of a further alternative fiber termination block similar to the fiber termination block of FIG. 19 and showing a jacketed cable clamped to a rear of the fiber termination block, and the smaller cable groups entering a bottom of the fiber termination block.

In the case of IFC cables, as shown in FIG. 21, cable 332 breaks out into smaller bundles of fibers 334, 335, such as ribbon cable, which fan out into individual fibers 336, 337, 338. A spool 382, and various fingers 378, 384, 386, 388 retain and position the various cables. A fanning clip 390 and a curved wall 392 can be provided for further developing, organizing and maintaining the fiber slack needed to allow for the forward movement of adaptor modules 316.

Figure 22:
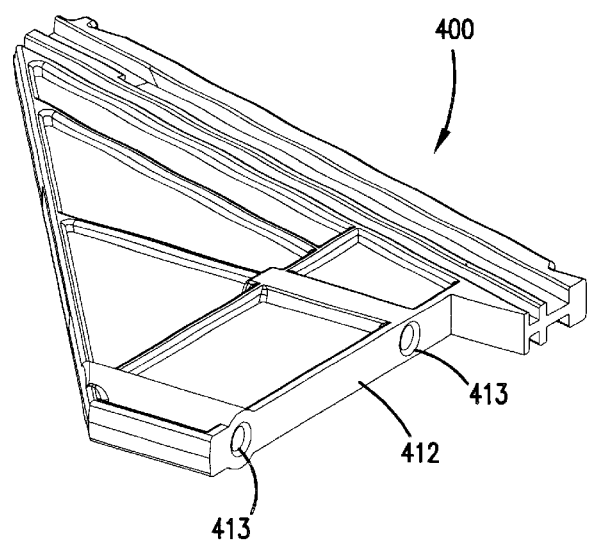
FIG. 22 is a perspective view of one of the walls supporting the sliding adaptor modules in the blocks shown in FIGS. 16–21.
Figure 24:
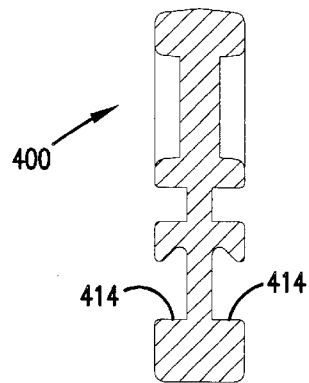
FIG. 24 is a cross-sectional top view of the wall through lines 24—24 of FIG. 23.
Figure 23:
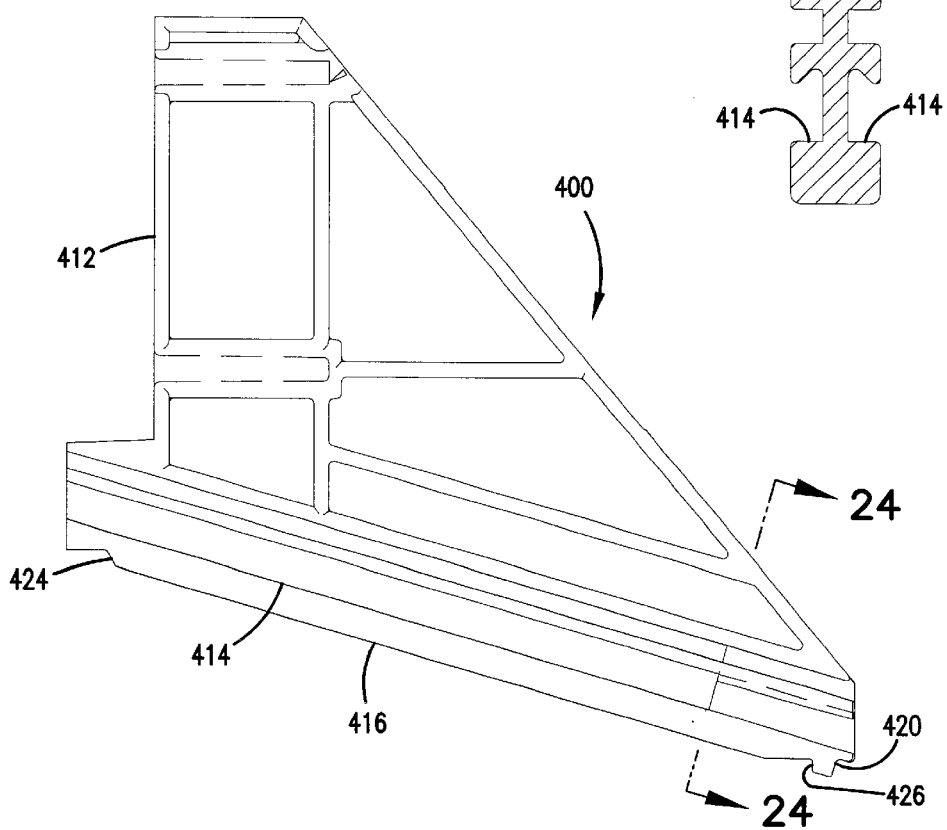
FIG. 23 is a side view of the wall of FIG. 22.
Figure 25:
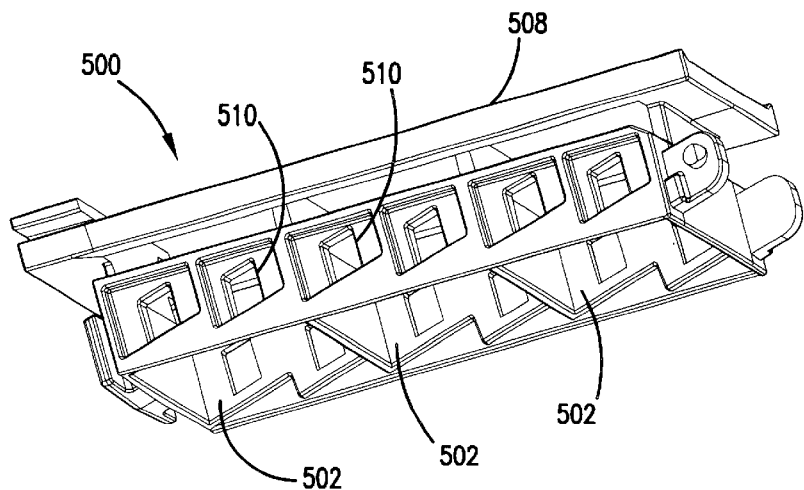
FIG. 25 is a perspective view of the module housing of the adaptor module sized for SC adaptors.
Figure 26:
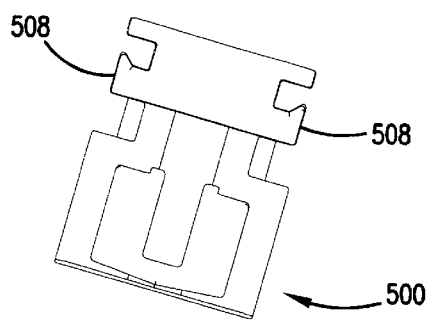
FIG. 26 is a end view of the module housing FIG. 25.
Figure 27:
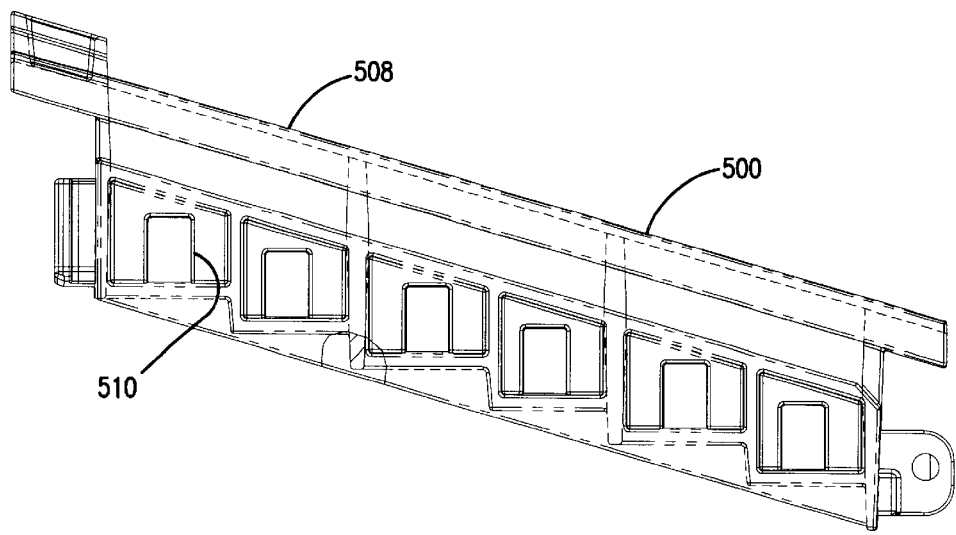
FIG. 27 is an end view of the module housing FIG. 25.
Figure 28:
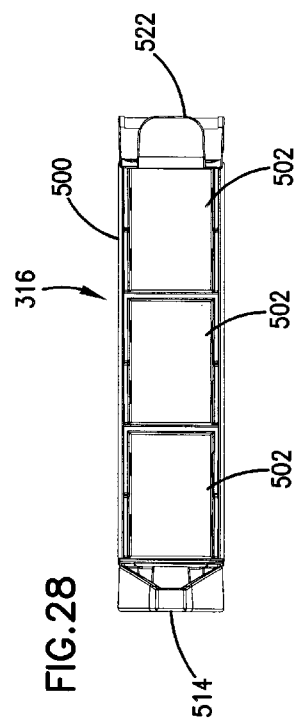
FIG. 28 is a front view of the adaptor module including the module housing of FIG. 25 with a pivoted lever on one end, and a spring biased clip on the other end.

Referring now to FIGS. 22–24, walls 400 of fiber termination block 200 are shown. Wall 400 mounts to base 410 of block 330 along lower edge 412, such as with fasteners into holes 413. Wall 400 defines opposite facing linear grooves 414 which slideably receive mating structure of the adaptor module 316 mounted thereto.

Figure 30:
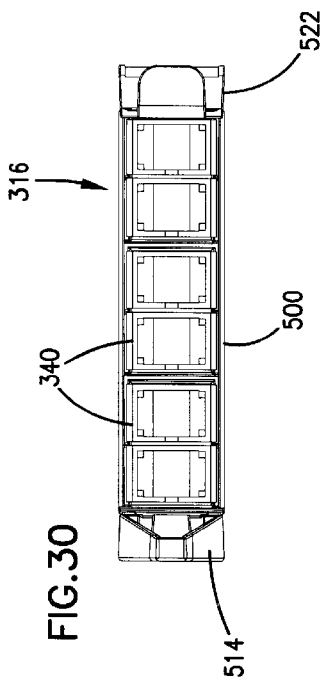
FIG. 30 is a front view of the adaptor module of FIG. 28 including six SC adaptors.
Figure 31:
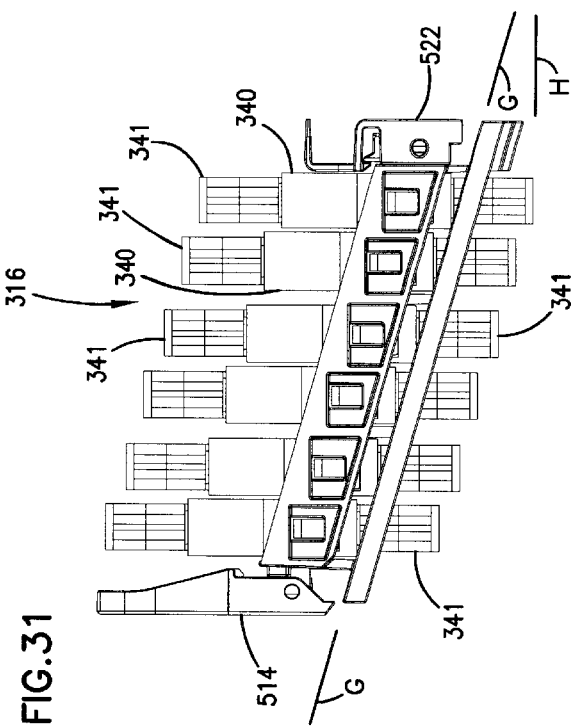
FIG. 31 is a side view of the adaptor module of FIG. 30.
Figure 32:
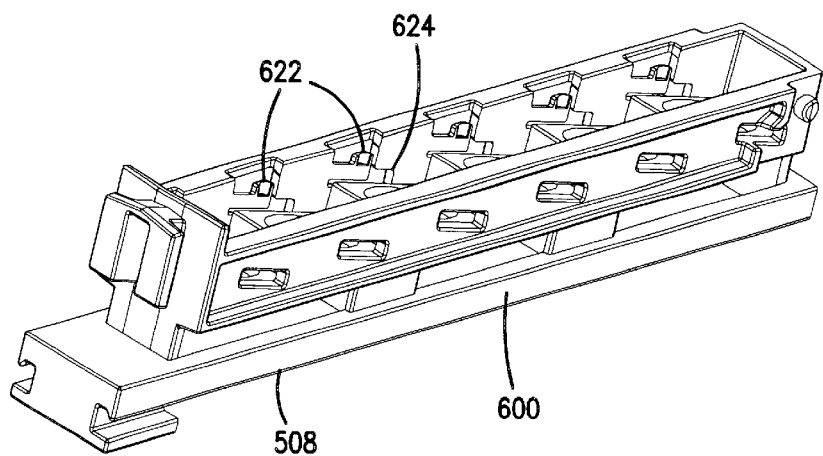
FIG. 32 is a perspective view of a module housing sized for FC adaptors.
Figure 33:
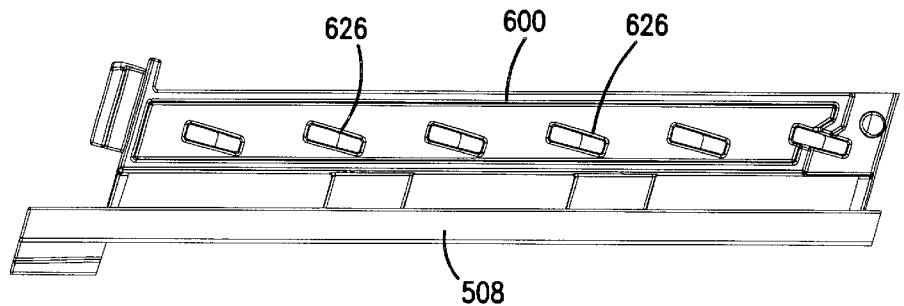
FIG. 33 is an end view of the module housing of FIG. 32.
Figure 34:
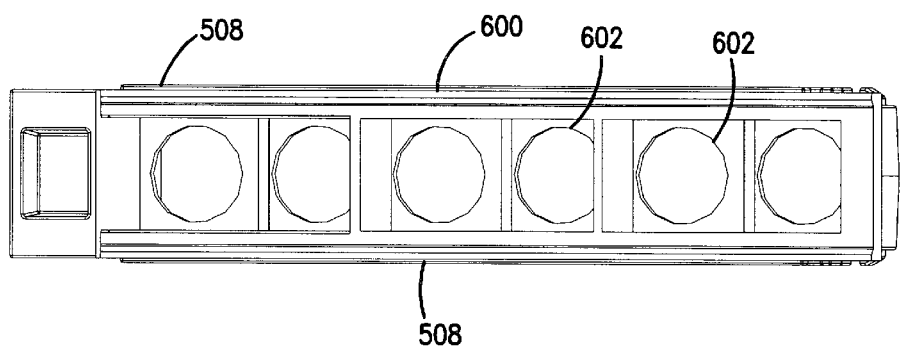
FIG. 34 is a side view of the module housing of FIG. 32.
Figure 37:
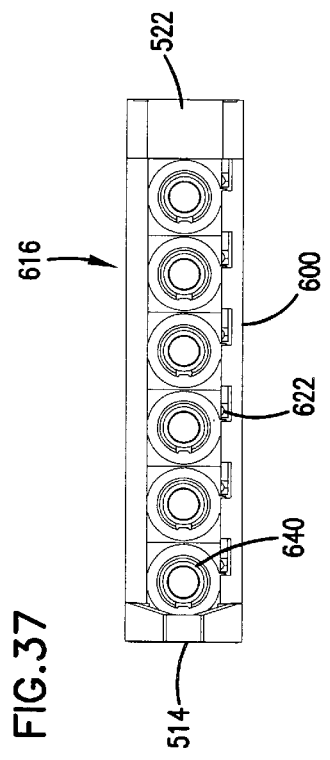
FIG. 37 is a front view of the adaptor module of FIG. 35 including six FC adaptors.
Figure 39:
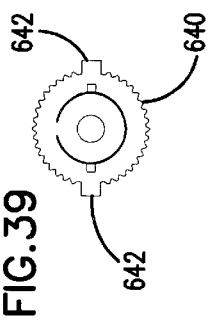
FIG. 39 is an end view of an FC type adaptor.
Figure 38:
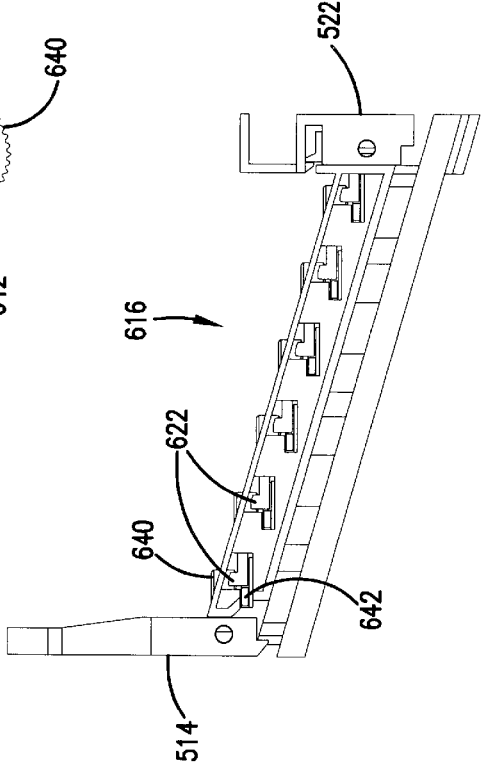
FIG. 38 is a side view of the adaptor module of FIG. 37.
Figure 35:
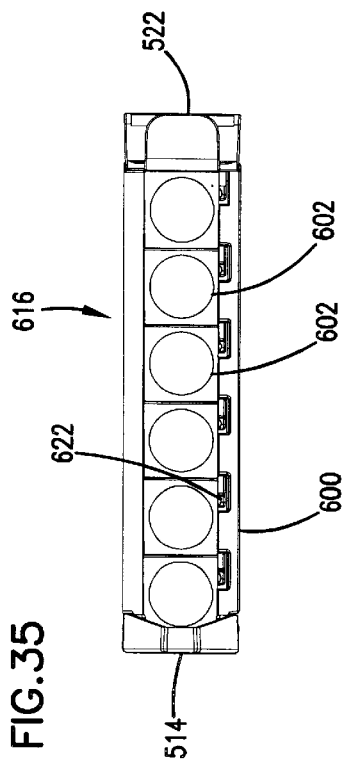
FIG. 35 is a front view of the adaptor module including the module housing of FIG. 32 with a pivoted lever on one end, and a spring biased clip on the other end.
Figure 36:
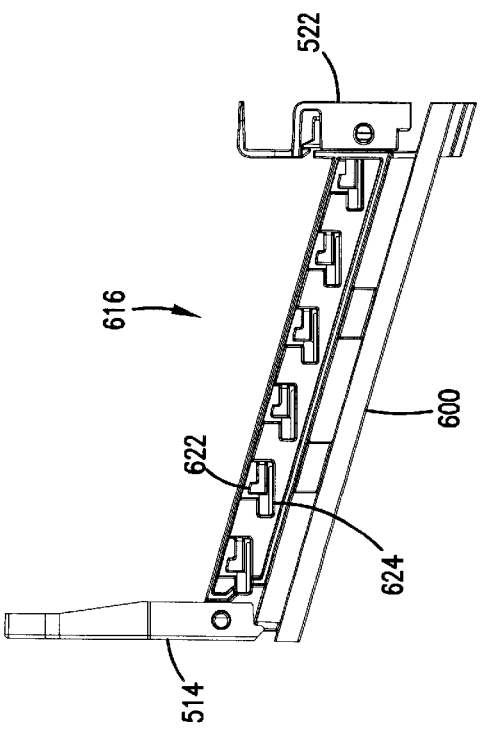
FIG. 36 is a side view of the adaptor module of FIG. 35.

Referring now to FIGS. 25–31 adaptor modules 316 include a module housing 500 with cooperating guides 508 formed as rails for slideably mating with the grooves 414 of opposed walls 400. Housing 500 includes openings 502 for receiving adaptors 340. SC type are shown in FIGS. 30 and 31 as adaptors 340, including dust caps 341. In the example shown, three openings 502 receive six adaptors 340. The SC adaptors 340 snap into side openings 510. SC type adaptors, and the corresponding mating connectors are shown for example in U.S. Pat. No. 5,317,663, the disclosure of which is incorporated by reference.

Figure 29:
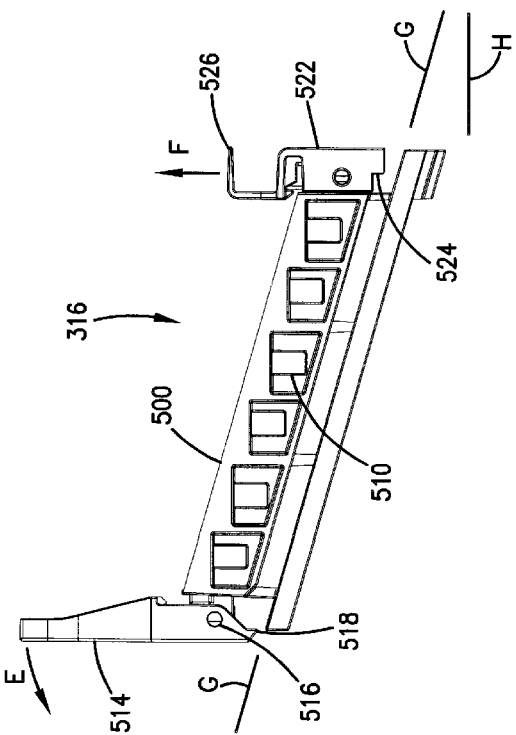
FIG. 29 is a side view of the adaptor module of FIG. 28.

Module 316 includes a pivoting handle 514 which pivots about hinge 516 in the direction of arrow E in FIG. 29. Tip 518 engages end 420 of wall 400 to lift adaptor module housing 500 so as to allow movement from the retracted position to the extended position. Slide handle or clip 522 engages edge 416 of wall 400. Corner 524 engages first notch 424 to retain module 316 in the retracted position. The handle 514 moves corner 524 out of first notch 424 to allow movement to the extended position through a pulling motion by the user. Corner 524 falls into second notch 426 in the fully extended position to keep module 316 from sliding off of walls 400. Slide handle 522 is spring loaded to resist movement of handle portion 526 in the direction of arrow F in FIG. 29. Slide handle can be moved manually to allow module 316 to be separated from walls 400, and the rest of block 300, such as for repair or replacement of the adaptors.

As shown in FIGS. 29 and 31, axis G defines the line of travel and presents the adaptors 340 is a staggered arrangement relative to transverse direction H. Such relative positioning helps reduce cable pull as module 316 is moved linearly along axis G.

Referring now to FIGS. 32–39, an FC type adaptor module 616 is provided instead of the SC type in FIGS. 25–31. FC adaptors 640 are snapped or otherwise mounted in openings 602 in module housing 600. A resilient clip 622 and slots 624, 626 cooperate with opposed tabs 642 on FC adaptor 640 to hold the adaptor to housing 600. Module 616 has rails 508, as module 316 above, but a different interior structure for mating with the different adaptors. Other types of adaptors can be used, if desired.

The fiber termination block design above with the angled modules reduces the tension on installed fiber cables when sliding modules 316, 516 are moved to access installed fiber. Such an angled sliding design helps reduce the pull on the front cables as longer modules are employed. The angled modules can be used instead of or in combination with the front dividers 134, 136, 138 and/or the surface treatments noted above to assist with cable management and prevention of undue stress and pull applied to the cable.

With regard to the foregoing description, it is to be understood that changes may be made in detail, especially in matters of the construction materials employed and the shape, size and arrangement of the parts without changing the scope of the present invention. It is intended that the specification and depicted aspects be considered exemplary only, with the true scope and spirit of the invention being indicated by the broad meaning of the following claims.

What is claimed is as follows:

1. A signal transmission cable management system comprising:
   a fixture; and
   a plurality of modules mounted on the fixture with each of the modules movably mounted on the fixture for movement along a line of travel, each one of the modules including a plurality of adaptors for holding a fiber optic connector, each adaptor having opposite ends for coupling to a fiber optic cable connector, each one of the adaptors movable with the one of the modules along the line of travel, the plurality of adaptors linearly disposed along the line of travel for each of the modules, each adaptor defining a longitudinal connector axis, the connector axes positioned parallel to one another, the line of travel of each module positioned at a non-perpendicular angle to the connector axes.

2. As system according to claim 1 wherein each of the plurality of adaptors couples first and second SC fiber optic cable connectors.

3. A system according to claim 1 wherein each of the plurality of adaptors couples first and second FC fiber optic cable connectors.

4. A system according to claim 1 wherein the modules each have a longitudinal axis, the modules mounted on the fixture in side-by-side relation with the longitudinal axes generally parallel to the line of travel, the plurality of adaptors linearly disposed along the longitudinal axis.

5. A system according to claim 1 wherein the fixture defines a plurality of channels, each of the modules being disposed within a respective channel, and further comprising cooperating guides on each of the modules and within the channels accommodating movement of each of the modules along the line of travel.

6. A system according to claim 5 further including a plurality of spaced-apart walls, opposing pairs of the walls defining the plurality of channels, each of the modules being disposed within a respective channel, and wherein the cooperating guides are on each of the walls for attaching the modules to the walls.

7. A system according to claim 1, further comprising a releasable lock for locking each module to the fixture in a first position, each of the locks being releasable to allow movement of each of the modules to a second position along the line of travel.

8. In a signal transmission cable management system having a fixture including a plurality of spaced apart walls defining a plurality of parallel spaced apart cavities, the walls including first and second parallel and opposing recesses; a module for mounting in the cavities, the module comprising:
   a body sized to be slideably received within the cavity for movement along a line of travel, the body having first and second parallel rails, the rails sized to be slideably received within the recesses; and
   the body including a plurality of adaptors for connecting a plurality of fiber optic cables to the body, the plurality of adaptors linearly aligned along the line of travel, each adaptor defining a longitudinal connector axis, the connector axes positioned parallel to one another, the line of travel of each module positioned at a non-perpendicular angle to the connector axes.

9. A module according to claim 8 wherein each of the plurality of adaptors couples first and second SC fiber optic cable connectors.

10. A module according to claim 8 wherein each of the plurality of adaptors couples first and second FC fiber optic cable connectors.

11. A module according to claim 8 comprising a latch for securing the body to the fixture in a first position.

12. A fiber optic connector assembly comprising:
    a fixture having a first end and a second end;
    a plurality of signal transmission modules mounted on the fixture between the first and second ends, with each of the modules movably mounted on the fixture for movement along a line of travel, each one of the modules including a plurality of adaptors for holding a fiber optic connector, each one of the adaptors movable with one of the modules along the line of travel, each adaptor defining a longitudinal axis, the longitudinal axes extending parallel to one another between the front end and the back end of the fixture, the line of travel of each module positioned at a non-perpendicular angle to the longitudinal axes;
    a cable fanning device positioned at the first end, the cable fanning device including a series of spaced cable guides, each cable guide having a linear body extending transversely to the longitudinal axes, the linear body having a curved outer surface, the cable guides positioned such that each of the cables connected to a first side of the modules extends from the adaptors in the modules to the curved body of one of the cable guides and passes into a cable channel on the first end of the fixture;
    wherein the line of travel of each module is angled toward the cable fanning device.

13. The fiber optic connector assembly of claim 12, wherein a first and a second group of signal transmission modules are movably mounted adjacent to one another on the fixture and are configured so that the line of travel of the first group of signal transmission modules is positioned in a mirror image to the line of travel of the other group of signal transmission modules, and further that the first group and the second group of signal transmission modules are configured to move in opposite angled directions to the cable fanning device.

14. An optical fiber distribution frame comprising:
    a support structure defining a vertical support;
    a plurality of fiber optic connector assemblies mounted on the vertical support in a single row, each fiber optic assembly including:
      a fixture having a first end and a second end;
      a plurality of signal transmission modules mounted on the fixture with each of the modules movably mounted on the fixture for movement along a line of travel, each one of the modules including a plurality of adaptors for holding a fiber optic connector, each one of the adaptors movable with one of the modules along the line of travel, each adaptor defining a longitudinal axis, the longitudinal axes extending parallel to one another between the front end and the back end of the fixture, the line of travel of each module positioned at a non-perpendicular angle to the longitudinal axes;

a cable fanning device positioned adjacent to the first end, the cable fanning device including a series of spaced arcuate cable guides, each arcuate cable guide having a linear body extending transversely to the longitudinal axes, the linear body having a curved outer surface, the arcuate cable guides positioned such that each of the cables connected to a first side of the modules extends from the adaptors in the modules to the curved body of one of the arcuate cable guides and passes into a cable channel on the first end of the fixture;

wherein the line of travel of each module is angled toward the cable fanning device.

15. The optical fiber distribution frame of claim 14, wherein a first and a second group of signal transmission modules are movably mounted adjacent to one another on the fixture and are configured so that the line of travel of the first group of signal transmission modules is positioned in a mirror image to the line of travel of the other group of signal transmission modules, and further that the first group and the second group of signal transmission modules are configured to move in opposite angled directions to the cable fanning device.

16. The optical fiber distribution frame of claim 14, wherein the adaptors are staggered along the line of travel.

17. The optical fiber distribution frame of claim 14, further comprising a cable storage spool adjacent to the second end of the fixture.

18. The optical fiber distribution frame of claim 14, further comprising a rear cable storage spool adjacent to the second end of the fixture.

19. A system according to claim 1, wherein the adaptors are staggered along the line of travel.

20. A module according to claim 8, wherein the adaptors are staggered along the line of travel.

21. The fiber optic assembly of claim 12, wherein the adaptors are staggered along the line of travel.

* * * * *

UNITED STATES PATENT AND TRADEMARK OFFICE
CERTIFICATE OF CORRECTION

PATENT NO.      : 6,591,051 B2
DATED           : July 8, 2003
INVENTOR(S)     : Solheid et al.

It is certified that error appears in the above-identified patent and that said Letters Patent is hereby corrected as shown below:

<u>Column 11,</u>
Line 26, "As system" should read -- A system --

Signed and Sealed this

Seventh Day of October, 2003

JAMES E. ROGAN
*Director of the United States Patent and Trademark Office*